United States Patent [19]

Goldwasser et al.

[11] Patent Number: 4,926,479
[45] Date of Patent: May 15, 1990

[54] MULTIPROVER INTERACTIVE VERIFICATION SYSTEM

[75] Inventors: Shafi Goldwasser; Joseph Kilian, both of Cambridge, Mass.; Avi Wigderson; Michael Ben-Or, both of Jerusalem, Israel

[73] Assignees: Massachusetts Institute of Technology, Cambridge, Mass.; Yissum Research Development Company of the Hebrew University of Jerusalem, Jerusalem, Israel

[21] Appl. No.: 188,284

[22] Filed: Apr. 29, 1988

[51] Int. Cl.$^5$ .............................................. H04K 1/00
[52] U.S. Cl. ...................................... 380/23; 380/25; 380/49; 340/825.31; 340/825.34
[58] Field of Search .................................... 380/23-25, 380/28, 30, 2, 18, 21, 40, 49, 50; 364/200, 900; 340/825.31, 825.34

[56] References Cited

U.S. PATENT DOCUMENTS

| | | | |
|---|---|---|---|
| 3,781,472 | 12/1973 | Goode et al. ............................ | 380/2 |
| 3,886,313 | 5/1975 | Branscome et al. .................... | 380/40 |
| 4,013,837 | 3/1977 | Branscome et al. .................... | 380/21 |
| 4,020,285 | 4/1977 | Branscome et al. .................... | 380/21 |
| 4,091,423 | 5/1978 | Branscome ............................... | 380/18 |
| 4,140,873 | 2/1979 | Kinch, Jr. et al. ..................... | 380/18 X |
| 4,368,357 | 1/1983 | Gurak ...................................... | 380/2 |
| 4,731,842 | 3/1988 | Smith ...................................... | 380/24 |
| 4,748,668 | 5/1988 | Shamir et al. .......................... | 380/30 |

*Primary Examiner*—Stephen C. Buczinski
*Assistant Examiner*—Bernarr Earl Gregory
*Attorney, Agent, or Firm*—Hamilton, Brook, Smith & Reynolds

[57] ABSTRACT

In a multiparty verification system, a prover and a verifier are coupled to process respective outputs to provide a system output such as an identification verification. The prover is formed of plural units which share confidential information used to encrypt information carried by the prover. Communication between the prover units is prevented. The first prover unit encrypts the information based on additional information received from the verifier and transfers the encrypted information to the verifier. Subsequently, the verifier obtains from the second prover unit the shared confidential information required to decrypt a subset of the transmitted encrypted information.

20 Claims, 1 Drawing Sheet

MULTIPROVER INTERACTIVE VERIFICATION SYSTEM

BACKGROUND OF THE INVENTION

An identification scheme is a method by which a party A can prove to a party B that he is indeed A. In 1976 Diffie and Hellman (DH) introduced the idea of digital signatures. In 1978 Rivest, Shamir and Addleman (RSA) suggested an implementation of this idea based on the assumption that factoring large integers is a hard computational problem. However, there is no known proof that party B who is validating the identity of a using digital signatures cannot turn around falsely, and prove that he is A to a third party C, even under the assumption that factoring integers is a hard computational problem. Moreover, the cost of using the RSA digital signature scheme is about k modular multiplications each of cost $k^2$ k digit numbers. The smallest value of k considered secure today is k =200. This makes using RSA for identification in software too slow, and in hardware and VLSI to expensive and special purpose.

In 1985 Goldwasser, Micali and Rackoff (GMR) presented the idea of "Zero-Knowledge Interactive Proof-Systems" which are interactive procedures by which a party A (the prover) can convince a party B (the verifier) that a theorem is true without telling B anything else. One possible theorem would be that A knows how to perform a hard computation. If the ability to perform this computation identifies A, an interactive identification scheme immediately follows.

In 1986 Goldreich, Micali and Wigderson (GMW) showed that if one-way functions exist then every language in nondeterministic polynomial time (NP) has a computationally zero-knowledge interactive proof system. Although theoretically quite exciting, using their result in practice would be very inefficient.

In 1986 Shamir and Fiat (FS) suggested a particular zero-knowledge identification scheme based on the assumption that distinguishing quadratic residues from non-residues modulo composite integers is a hard problem. A number of modular multiplication of many-digit numbers are required.

An example of a zero knowledge identification scheme based on the ideas of GMW and Blum is illustrated in FIG. 1. In that system, a prover A must prove its identification to a verifier B. The prover A may, for example, be a smart card having a processor thereon and the verifier B may be an automatic teller machine. Other forms of the prover A include credit cards, access control cards and digital passports. The prover A carries an identification set of information $S_i$ which is unique to prover A and which is also known to verifier B. Knowledge of that identification set of information, however, is not considered sufficient to identify prover A, because it is generally available at least to verifiers and an eavesdropper from a prior identification may also have that identification set. To prove its identity, prover A must prove that it also has access to a solution subset $S_s$ without actually disclosing that solution subset to either the verifier B or a potential eavesdropper. This result is accomplished by means of a zero knowledge system.

The solution subset should have a predetermined mathematical relationship with the identification set and be readily verifiable as a proper solution, but it should not be readily determinable from the identification set. For example, as illustrated in FIG. 1B, the identification set could be the graph illustrated. The solution subset could be the listing of vertices which identify a Hamiltonian cycle; that is, a cycle such as shown in bold lines which intersects each vertex without overlap. The graph of FIG. 1B is very simple for purposes of illustration. With more complex graphs, a Hamiltonian cycle may be nearly impossible to determine from the full graph. On the other hand, by starting with a Hamiltonian cycle, one can develop a complex graph which includes the cycle so that prover A could be provided with both the complex graph as the identification set $S_i$ and the Hamiltonian cycle as the solution subset $S_s$. The cycle and graph would be generated by the prover itself or by a trusted center.

Given that prover A has access to both the identification set and the solution subset, and that the verifier B only has access to the identification set, the task remains for prover A to prove to the verifier B that it in fact has access to the solution set without actually reealing the solution set to verifier B. To that end, the prover has a permutator $\pi$, an encryptor E and a decryptor. Based on a random sequence, the vertices of the identification set graph can be permutated for successive message transmissions to the verifier. Thus, the permutated graph $S_{\pi i}$ shown in FIG. 1B is the initial identification graph with the vertices renumbered according to some random process. Prover A then encrypts the individual elements of the permutated identification set of information for transfer as $S_{i\pi E}$ to the verifier B. Also, the permutation $\pi$ is encrypted for transfer to verifier B. As illustrated in FIG. 1C, this encryption is analagous to the placement of each vertex of the permutated identification set in a respective envelope for transfer to verifier B. Such a transfer is a commitment by prover A to the permutated graph as well as to the permutation which allows for reconstruction of the original graph $S_i$; however, the encryption "envelopes" cannot then be opened by the verifier B.

Next, the verifier randomly selects, for each of successive encrypted permutated graphs, either the entire identification set or the solution subset. In response to that random selection, the prover A either opens all encryption envelopes or only those envelopes corresponding to the solution subset. If all envelopes are opened by transferring the original nonencrypted permutated identification set $S_{\pi i}$ and the nonencrypted permutation $\pi$, the verifier B can reconstruct $S_i$ and compare the reconstructed set to the already available identification set $S_i$. This proves that A had in fact committed to a permutation of the identification set. As already noted, if this were the only test, there would be no verification because others might have access to that identification set. However, the verifier may at random select the solution subset. In that case, the prover A returns only the nonencrypted permutated vertices of the Hamiltonian cycle. For example, the Hamiltonian cycle illustrated in FIG. 1B would be returned to the verifier as follows: (1,2), (2,3), (7,3), (7,4), (4,5), (5,6) and (1,6). Because the information is permutated and the permutation $\pi$ is not in this case available to B, B cannot make a correspondence between the permutated Hamiltonian cycle and the original nonpermutated cycle $S_i$ and thus gain knowledge of the Hamiltonian cycle corresponding to $S_i$. However, B could step through the vertices to confirm that the permutated vertices in fact create a cycle naming each of the seven vertices without overlap.

For a full commitment by A, the prover A must encrypt the information in a manner which cannot readily be decrypted by the verifier or an eavesdropper; yet the encryption method must allow the verifier to readily confirm that, when provided with both the encrypted information and the nonencrypted information, one is the true encryption of the other. For example, in using for encryption the RSA function $m^3$ mod n where m is the transferred message and n is a multidigit product of two primes, the verifier could not readily decrypt the information. However, with the nonencrypted information later provided with selection of all vertices and the permutation, the verifier could itself easily encrypt the information and compare it to the encrypted information to which the prover had already committed itself.

Thus, because the prover A had committed to the full set of vertices, it must know both the identification set and the solution subset in order to be correct with either selection made by the verifier. For any one transfer of a permutated graph, the prover A could transfer either the proper graph with an incorrect solution or the proper solution with an incorrect graph. However, it could not transfer both a correct graph and a correct a cycle without access to the solution. With one transfer of the permutated graph, the verifier could only verify to fifty percent probability; however, with successive transfers of the permutation graph and random selections, the verifiction becomes more and more certain. If the prover does not have both the identification set and the solution set, the verifier would soon select an incorrect full graph or an incorrect cycle from the prover.

Previous methods of commitment such as that just described are based on the assumption that one-way functions, such as the RSA function, exist. This assumption has not yet been proven. Further, the many modular multiplications of large digit numbers required for secure use of the RSA and other functions make those functions too slow for software and too expensive for hardware. Further, the approaches lose security when performed in parallel, that is, when multiple permutated graphs are transferred to the verifier in parallel.

DISCLOSURE OF THE INVENTION

An object of the present invention is to provide a verification system in which a computationally less complex encryption approach may be utilized. Complex one-way functions are not necessary where encryption is based on random (including pseudorandom) information, a so-called one-time-pad encryption scheme. Thus, in a system embodying the present invention the identification set may be encrypted utilizing random information generated at the prover. However, with such encryption, the verifier is no able to verify the decryption without the random information utilized in the encryption, and that can only be obtained from the prover. If the verifier then looked to the prover of FIG. 1A for that information, the prover would have the opportunity to provide false information depending on the verifier's selection. The false information would be other than that with which the identification set had been encrypted, and the prover could guarantee the appearance of a correct solution to the verifier if the verifier selected the permutated solution set. Thus the system would fail.

In accordance with the present invention, to overcome the above shortcoming, the prover comprises first and second prover units which share confidential prover encryption information. The first prover initially encrypts the identification set with that information, and the second prover later provides to the verifier the prover encryption information required for decryption. To make the second prover unit ignorant of the actual information which had been transferred by the first prover unit, the encryption is also based on verifier encryption information received from the verifier, and communications between the two prover units during the verification are limited to prevent cheating. The verifier encryption information is held confidential from the second prover unit though it may be read by an eavesdropper. In providing the prover encryption information required for decryption, the second prover unit lacks the verifier encryption information required to fool the verifier by modifying the encryption information. Thus, in a method embodying the present invention, the first prover unit commits itself to encrypted identification information based on encryption information shared by the first and second prover units, and the second prover unit provides the information required for decryption. Preferably, the confidential verifier information and the confidential prover informaion on which the encryption is based on both random.

In a more specific implementation of the present invention, after receipt of encrypted information, the verifier selects a subset of the encrypted information, such as the full identification set or a solution subset, for decryption. The encryption information provided to the verifier by the second prover unit corresponds to the selected subset of the encrypted information exclusively. Preferably, the selection information is chosen at random.

Preferably, both the prover and verifier have access to an identification set of information, and the prover alone has access to the identity of a solution subset of the identification set, the solution subset having a predetermined mathematical relationship with the identification set. The solution subset is readily verifiable as a proper solution but not readily determinable from the identification set of information. In a plurality of cycles with respect to identification sets permutated by the first prover unit, transfers of encrypted information include each permutated identification set. The selection information selects information including the full identification set or the solution subset, exclusively.

In one approach, the solution subset is a solution to the knapsack problem where the numbers of the solution subset sum to a target number. In a very specific implementation, encrypted permutated information based on the following is transferred by the first prover unit:

$A = \{v_i, 1 \leq i \leq n\}$ where $v_i$ is chosen at random in $$\left\{ 1, \ldots, \sum_{i=1}^{n} w_i \right\}.$$

$B = \{w_i, 1 \leq i \leq n\}$, the identification set
$C = \{s_i, 1 \leq i \leq n\}$ where $s_i = v_i + w_i$ for all $1 \leq i \leq n$
$D = \Sigma_{j \in J} v_j$
$E = J$, the solution subset
$F = T + \Sigma_{j \in J} v_j$, where T is the target The selection information selects (A,B,C), (A,D,E), or (C,E,F) with equal probability.

In another approach, the prover and verifier both have access to a graph which serves as the identification set, and the prover alone has access to a Hamiltonian cycle within the graph which serves as the solution set. Both the knapsack problem and the Hamiltonian cycle problem are well-known hard problems which are hard to invert yet easy to initially compute. Their use is particularly advantageous in the present two-prover approach because they allow for a simple protocol between the prover and verifier. The knapsack problem is the most preferred due to the ease with which specific hard instances can be generated.

The present invention is not restricted to identification schemes. The identification system is one example of a system in which two processors can together determine an output based on information available to only one of the processors and in which the one processor need not disclose its confidential information to assure the other processor of the validity of the output. More specifically, the Hamiltonian cycle and knapsack problem approaches described above are approaches in which one processor has access both to a function $F(x)$ and the confidential informaton $x$ and in which the second processor has access only to $F(x)$, $F(x)$ being a hard problem which is readily computed but which is difficult to invert. The successful identification, the output of the system, is based on $x$, and the second processor is assured of the validity of the identification, but the first processor need not disclose $x$ to the second processor.

Systems embodying the present invention may include more than two processors and more than two prover units per processor. Also, each processor may comprise plural units such that each processor may assume the roles of both prover and verifier.

A system embodying the present invention has the advantage of requiring no unproven assumptions to assure a zero knowledge system. Further, the encryption can be performed with a simple addition and can thus be readily implemented in software or inexpensive hardware. Also, the system is fully parallelizable without any decrease in security properties.

BRIEF DESCRIPTION OF THE DRAWINGS

FIGS. 1A, 1B, 1C illustrate a prior art identification system.

PREFERRED EMBODIMENTS OF THE INVENTION

Figure 2:
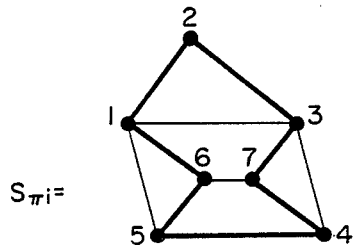
FIG. 2 illustrates an identification system embodying the present invention.
Figure 2:
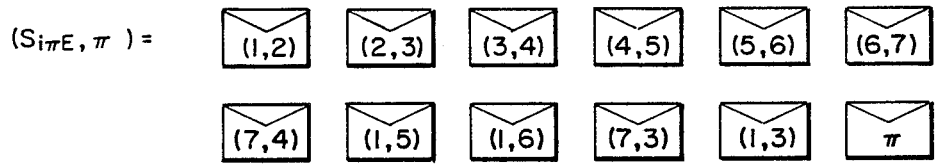
Figure 2:
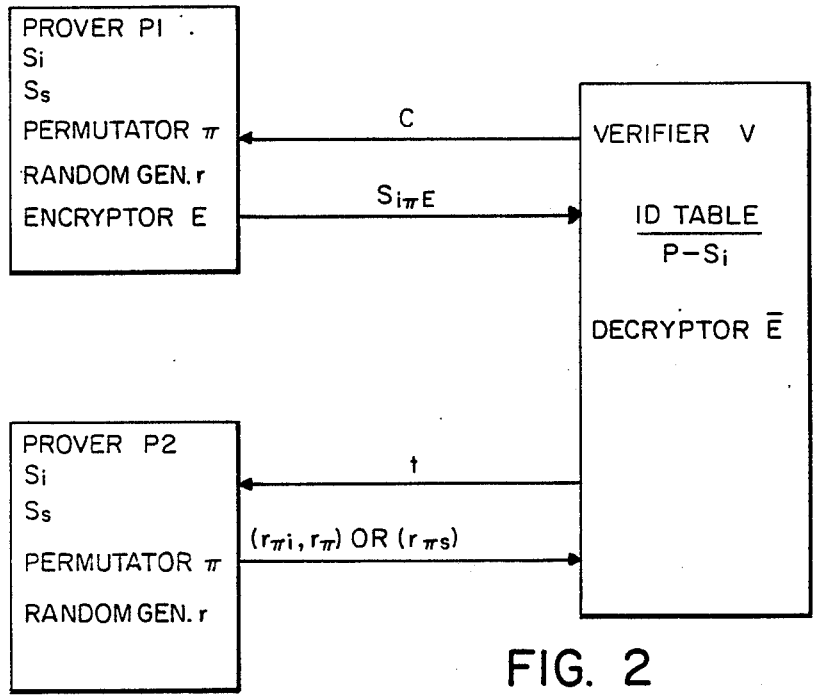

As illustrated in FIG. 2, the single prover of the prior art is replaced by two prover units P1 and P2. In its simplest form, each prover unit would be a smart card which carries a microprocessor. However, the prover may be a single card having separate units mounted thereon in a manner which limits communications therebetween. During a verification, the verifier V must guarantee that there is no communication between the two prover units P1 and P2 in order to be convinced of the validity of the identification. Communication can be prevented by physical distance and active jamming of any communication channel between the two units.

The dual prover units allow for a simplification of the commitment process for use in any one-way function identification technique such as that described above with respect to the Hamiltonian cycle. Prover P1 commits to the information by encrypting that information based on a confidential, preferably random, verifier encryption signal $c$ from the verifier and its own confidential, preferably random, prover encryption signal $r$. Utilizing the random information $r$, the encryption can be computationally very simple. Subsequently, to open the encryption envelopes of the full set of transmitted information or a subset thereof selected by the random signal $t$, prove P2 transfers the prover encryption information required for decryption by the verifier.

Say the message m to which P1 is to commit consists of 1 bit, i.e. $m \in \{0,1\}$. Let P1 and P2 share a secret random tape of $r_i$ each of which was chosen a priori at random from $\{0,1,2\}$. Let $\sigma_0(r_i) = r_i$ and $\sigma_1(0)=0, \sigma_1(1)=2, \sigma_1(2)=1$. To commit to ith bit m:

1. V sends c chosen at random in $\{0,1\}$ to P1.
2. P1 sends $\sigma_c(r_i) + m$ mod 3 to V.

To reveal ith bit m to V:

3. P2 sends $r_i$ to V.

To commit to longer messages m, simply commit bit-by-bit.

In the complete protocol, using the Hamiltonian cycle approach described in the background, the prover P1 generates successive permutations of the identification graph. Based on the random information c received from the verifier V, prover P1 selects either the function $\sigma_0$ or $\sigma_1$ for encryption. It then encrypts the permutated information using the function $$\sigma_c(r_i) + m \text{ mod } 3.$$

That encrypted permutated information is transferred to the verifier as the prover's commitment. Next, the verifier randomly selects either the full graph or the Hamiltonian cycle with the signal t. Prover P2 operates in parallel with prover P1 and thus can generate the same random numbers r and identify the solution subset which in this case is the Hamiltonian cycle. P1 returns the requested prover encryption information r to the verifier. Where the full graph is requested, the encryption information required to decrypt the permutation is also returned. Because V is now able to perform the decryption itself, it can readily verify that the decrypted information corresponds to the originally committed encrypted information and can also confirm that the decrypted information is either the identification set $S_i$ or a permutated cycle which includes every vertex of the graph without overlap. Therefore verification is complete.

A preferred hard problem which may be used as an alternative to the Hamiltonian cycle is the so-called knapsack problem. The knapsack problem is based on the assumption that, given a large set of large numbers, determination of a subset of numbers which sum to a target number is not possible. By starting with the subset, one can readily generate a larger set, both of which can be stored on the prover. However, given the larger set, determination of the subset is extremely difficult.

We describe the automatic teller machine application. The trusted center (the bank in this case) issues a pair of cards for every customer A to be identified. One card P1 has an instance of the knapsack problem on it. Both cards P1 and P2 have a shared pool of random bits. The instance of knapsack problem is a tuple ($w_i$, $1 \leq i \leq n, T, J \subset \{1, \ldots, n\}$), such that $\Sigma_{j \in J} w_j = T$. J is the solution subset. The bank stores a table having customer A's name along with ($w_i, 1 \leq i \leq n, T$), the identification set.

When A comes to the bank machine, the two cards are inserted into the machine and the following protocol is executed. Steps 1-3 are executed in parallel k times where k is a security parameter.

1. P1 permutes the $w_i$'s at random and accordingly the set J. Now, P1 commits to secrets A,B,C,D,E,F where
$A = \{v_i, 1 \leq i \leq n\}$ where $v_i$ is chosen at random in $$\left\{1, \ldots, \sum_{i=1}^{n} w_i \right\}.$$

$B = \{w_i, 1 \leq i \leq n\}$, the identification set
$C = \{s_i, 1 \leq i \leq n\}$ where $s_i = v_i + w_i$ for all $1 \leq i \leq n$
$D = \Sigma_{j \in J} v_j$
$E = J$, the solution subset
$F = T + \Sigma_{j \in J} v_j$, where T is the target 2. V sends to to P2 whre $t \in \{1,2,3\}$ at random.
3. If $t=1$, P2 reveals secrets A, B and C to V.
   If $t=2$, P2 reveals secrets A, D and E to V.
   If $t=3$, P2 reveals secrets C, E and F to V.
4. If in every execution of the above protocol; when $t=1$, $s_i = v_i + w_i$ for all $1 \leq i \leq n$; when $t=2$, $\Sigma_{j \in E} v_i = D$; and when $t=3$, $\Sigma_{j \in E} s_i = F$, then Bank accepts customer A as valid.

For all customers C other than A, the probability that C succeeds in convincing the Bank that he is A is less than or equal to $(1/3)^k$.

Further discussion of the model on which the invention is based and proofs related thereto follows.

1.1 New Model

We extend the definition of an interactive proof for language L as follows: instead of one prover attempting to convince a verifier that x, the input string, is in L, our prover consists of two separate agents (or rather two provers) who jointly attempt to convince a verifier that x is in L. The two provers can cooperate and communicate between them to decide on a common optimal strategy before the interaction with the verifier starts. But, once they start to interact with the verifier, they can no longer send each other messages or see the messages exchanged between the verifier and the "other prover". As in [GMR] the verifier is probabilistic polynomial time, and can exchange upto a polynomial number of messages with either one of the two provers (with no restriction on interleaving the exchanged messages) before deciding to accept or reject string x.[1]

[1] A proof-system for a language in this model is defined in a similar manner to [GMR]. Namely, L has a multi-prover interactive proof-system if there exist a verifier V and provers P1, P2 such that when $x \in L$ the probability that V accepts is greater than $\frac{2}{3}$, and when x is not in L then for all P1, P2, the probability that V accepts is less than $\frac{1}{3}$.

We restrict the verifier to send messages to the prover in a predetrmined order. It can be shown that this is equivalent with respect to language recognition, to a model in which the verifier is free to talk to the provers in any order he wishes. Moreover, the verifier can be forced to send messages to the provers in a predetermined order by using a simple password scheme. Thus, we can work in the easier to deal with synchronous model completely without loss of generality.

The main novelty of our model is that the verifier can "check" its interactions with the provers "against each other". One may thick of this as the process of checking the alibi of two suspects of a crime (who have worked long and hard to prepare a joint alibi), where the suspects are the provers and the verifier is the interrogator. The interrogators conviction that the alibi is valid, stems from his conviction that once the interrogation starts the suspects can not talk to each other as they are kept in separate rooms, and since they can not anticipate the randomized questions he may ask them, he can trust his findings (i.e receiving a correct proof of the proposition at hand).

Applying this model in a cryptographic scenario, one may think of a bank customer holding two bank-cards rather than one, attempting to prove its identity to the bank machine. The machine makes sure that once the two cards are inserted they can no longer communicate with each other. In this scenario, the provers correspond to the two cards, and the verifier to to bank machine.

1.2 Results

1.2.1 Perfect Zero Knowledge Multi-Prover Interactive Proofs

We show, that in our extended model all NP languages have a perfect zero-knowledge interactive proof-system, making no intractability assumptions.

The protocol for NP languages proposed, requires the two provers to share either a polynomially long random pad or a function which they can compute but the polynomially bounded verifier can not. It is well known that such functions exist by counting arguments. Most of the burden of the proof lies on one predetermined prover. In fact, the "other" prover sole function is to periodically output segments of the random pad he shares with the "primary prover". The protocol is constant (two) round.

Differently then in the case of the graph non-isomorphism and quadratic non-residuosity proof-systems in [GMR], [GMW], parallel executions of the protocol remain perfect zero-knowledge.

More generally, we show that any language which can be recognized in our extended model, can be recognized in perfect zero-knowledge making no intractability assumptions.

Our construction does not assume that the verifier is polynomial time bounded. The assumption that there is no communication between the two provers while interacting with the verifier, must be made in order for the verifier to believe the validity of the proofs. It need not be made to show that the interaction is perfect zero-knowledge.

1.3 Language Recognition Power of New Model

It is interesting to consider what is the power of this new model solely with respect to language recognition. Clearly, NP $\subseteq$ IP which in turn is a subset of languages accepts by our extended model. We show that adding more provers than two, adds no more power to the model.

We also show for every language possessing a two prover interactive proof there exists another two prover interactive proof which achieves completeness, i.e. the verifier will always accept strings which are in the language.

Fortnow, Rompel and Sipser [FRS] have shown that two provers can accept any language in IP (one-prover model with polynomial number of rounds) using only a constant number of rounds. They also show that three provers can accept in a constant number of rounds all languages recognized by a multi prover model.

Feige, Shamir and Tennenholtz [FST] look at a model they call the k-noisy oracle model, in which the verifier is interacting with k oracles all of which but one may be dishonest. Based on the assumption that one of the oracles is trusted, they show that P-space langauages can be recognized in a 2-noisy oracle model.

1.4 Open Problem

Whether the two-prover proof-system is actually more powerful with respect to language recognition than the original one-prover interactive proof-system of [GMR], [B], remains an open problem.

Even the simplest case of two-round two-prover proof-system in which the verifier sends the result of his coin tosses first (some to prover 1 and some to prover 2), receives responses (from both provers) on the subsequent round, and then evaluates a polynomial time predicate to decide whether to accept or reject, is not known to lie in PSPACE. Hastad and Mansour [HM] show that resolving this question in the positive will imply that NP$\neq$poly(log)−SPACE.

2. Definitions

Definition 1

Let $P_1, P_2, \ldots, P_k$ be Turing machines which are computationally unbounded and V be a probabilistic polynomial time Turning machine. All machines have a read-only input tape, a work tape and a random tape. In addition, $P_1, P_2, \ldots, P_i$ share an infinite read-only random tape of 0's and 1's. Every $P_i$ has one write-only communication tape on which it writes messages for V. V has k write-only communication tapes. On communication tape i, V writes messages to $P_i$. We call $(P_1, P_2, \ldots, P_k, V)$ a k-prover interactive protocol.

Remark 1

Fortnow, Rompel and Sipser [FRS] remark that the above can be modeled as a probabilistic polynomial time turning machine V and an oracle p such that queries to p are prefixed always by $1 \leq i \leq k$, corresponding to whether the query is directed to prover i. Each query contains the history of the communication thus far.

We note that although this memoryless formulation is equivalent to the i-prover formulation with respect to language recognition, it is not equivalent when zero-knowledge is considered. In this latter case the provers must be able to check that the history is indeed what is claimed by the verifier, before answering the next query. Since the verifier is not untrusted, the provers can not be memoryless.

Definition 2

Let $L \subset \{0,1\}^*$, We say that L has a k-prover interactive proof-system (IPS) if there exists an interactive BPP machine V such that:

1 $\exists P_1, P_2, \ldots, P_k$ such that $(P_1, P_2, \ldots, P_k, V)$ is a k-prover interactive protocol and $\forall x \epsilon L$, prob (V accepts input $x) \geq \frac{2}{3}$.

1 $\forall P_1, P_2, \ldots, P_k$ such that $(P_1, P_2, \ldots, P_k, V)$ is a k-prover interactive protocol, prob (V accepts input $x) \geq \frac{1}{3}$.

Remark 2 if L has an k-prover interactive proof-system and condition (1) holds for a particular $\hat{P}_1 \hat{P}_2, \ldots, \hat{P}_k$, then we say that $(_1, \hat{P}_2, \hat{P}_k, V)$ is a k-prover interactive proof-system for L.

Remark 3 if L has an two-prover interactive proof-system, then L has a two-prover interactive proof-systems $(P_1, P_2, V)$ such that for $x \epsilon L$, prob (V accepts $x) = 1$. See Theorem 5.

Remark 4

For convenience, without loss of generality, we assume that every verifier V outputs his coin tosses at the end of his interaction with the Pi's.

Definition 3

Let IPk = {L which have k-prover interactive proof-system}.

The following definition of perfect zero-knowledge is identical to the Goldwasser-Micali-Rackoff [GMR] definition of perfect zero-knowledge in the 1-prover model.

Definition 4

Let $(P_1, P_2, \ldots, P_i, V)$ be a k-prover interactive proof-system for L. Let View $P_1, P_2, \ldots, P_k, V)$ (x) denote the verifier's view during the protocol (namely the sequence of messages exchanged between the verifier and the two provers including the last message of the verifier which contains his coin tosses—see remark 4 above). This is a probability space taken over the coin tosses of V and the joint random tape of $P_1, P_2, \ldots, P_k$. We say that k-prover interactive protocol $(P_1, P_2, \ldots, P_k, V)$ is perfect zero-knowledge for V if there exists a BPP machine M such that $M(x) = \text{View } P_{1,P_2,\ldots,V}(x)$. We say that L has a k-prover perfect zero-knowledge proof-system if there exists provers $P_1, P_2, \ldots, P_i$ such that for all BPP verifiers V, there exists a probabilistic Turning machine M such that for all x in L, $\bar{M}(x) = \text{View}_{P_1,P_2,\ldots,P_k,\hat{V}}(x)$ and M(x) terminates in expected polynomial time.

3. Statement of our Results

Theorem 1

Every $L \epsilon NP$ has a two-prover perfect zero-knowledge interactive proof-system.

Proposition 1 parallel executions of the perfect zero-knowledge interactive proof-system for NP remain perfect zero-knowledge.

Theorem 2

Every $L \epsilon IP_2$ has a perfect zero-knowledge interactive proof-system.

Theorem 3

Any two party oblivious function computation can be done in this model.

Theorem 4

For all $k \geq 2$, if $L \epsilon IP_k$ then $L \epsilon IP_2$.

Theorem 5

If $L \epsilon IP_2$ then $\exists P_1, P_2, V$ such that $(_1, P_2, V)$ is a two-prover interactive proof-system for L and for all x $\epsilon L$, Prob(V accepts $x) = 1$.

3. Key Ideas

A general primitive used in complexity based cryptography (and in particular in the proof that NP is in zero-knowledge under the assumption that one-way functions exist) is the ability to encrypt a bit so that the decryption is unique. In our model, encryption is replaced by a commitment protocol to a bit such that the bit is equally likely to be 0 or 1 (information theoretically), and yet the probability that a different bit can be decommited (i.e. revealed) is less than $\frac{1}{2}$ (this fraction can then be made arbitrarily small using standard techniques). The idea is that one prover is used to commit the bit, and the other to reveal it.

Another important primitive is that of oblivious circuit evaluation. This primitive allows two parties, A and B, possessing secrets i and j respectively, to compute some agred upon function f(i,j) in such a way that A learns nothing, and B learns only f(i,j). the original implementation of this protocol, due to Yao [Yao86a], requires the existence of trapdoor functions. In fact, oblivious circuit evaluation can not be implemented without cryptographic assumptions in the standard two party scenario. However, we show that oblivious circuit evaluation between verifier and 1 prover can be done without assumptions in the two-prover model. The proof relies on a result of [K] reducing oblivious circuit evaluation to a simpler protocol, known as 1-out-of-2 oblivious transfer, which was reduced by [C] to a still simpler protocol, known as oblivious transfer. This last protocol is implemented in the two-prover model.

4 Proof of Theorem 1: How to Commit Bits

We first show that every language in NP has a perfect zero-knowledge two-prover interactive proof-system.

Theorem 1

Every L in NP has a two-prover perfect zero-knowledge interactive proof-system

Idea of Proof

Let $(P_1, P_2, V)$ denote a multi-prover protocol which receives as input the graph $G=(V,E)$. Let $P_1$ and $P_2$ share an infinite random pad R such that $R=r_1r_2\ldots$ where $r_i \in \{0,1,2\}$[2]. Let $n=|V|$.

[2] Alternatively, R can be replaced by the outcome of f(x) where x is the input and f:{0,1}* −> {0,1}* is a function such athat for all x ∈{0,1}*, for all i<|f(x)|, the i-th bit of f(x) is equally likely to be 0 or 1 with respect to any probabilistic polynomial time machine. Such functions can be shown to exist by standard diagonalization techniques over all probabilistic polynomial time machines.

Let us quickly review[3] one of the, by now standard proofs ([GMW1], [B1]) that NP is in zero-knowledge under the assumption that one-way functions exist.

[3] the proof reviewed is from [B1[

Review

The prover is attempting to convince the verifier that G is Hamiltonian.

The prover publicizes an probabilistic encryption algorithm E (as in [GM], [Yao82a][4]) The prover and verifier repeat the following protocol n times:

[4] The encryption algorithm E is public. We denote $\gamma \epsilon E(m)$ to mean that there exists string r such that algorithm E using r for his coin tosses, on input m, produces $\gamma$. Given $\gamma$ there exists unique m, r such that E, on coin tosses r and input m outputs $\gamma$. To decrypt $\gamma$ both m, r are revealed.

STEP 1: prover randomly permutes the vertices of graph $\hat{G}$ (using permutation $\pi$) to obtain graph G and sends to verifier
- an $n \times n$ matrix $\alpha = \{a_{ij}\}$ where $a_{ij}$ in $E(b_{ij})$ and $b_{ij} = 1$ if edge ij is present in the $\hat{G}$ and 0 otherwise.
- $\beta \epsilon E(\pi)$, i.e an encryption fo $\pi$.

STEP 2: verifier chooses at random coin $\epsilon\{0,1\}$, and sends coin to the prover.

STEP 3: If coin=1, prover decrypts $\beta$ and $a_{ij}$ for all $i,j \leq n$ and sends decryptions to verifier. If coin=0, prover decrypts those $a_{ij}$ such that edge ij is in the Hamiltonian path in $\hat{G}$.

STEP 4: If prover is unable to preform step 3 correctly, verifier rejects. Otherwise, after n iterations of steps 1 through 4, verifier accept.

End of Review

Returning to the two prover model, prover $P_1$ replaces the prover in step 1 of above protocol and prover $P_2$ replaces the prover in step 2 of above protocol. Algorithm E is no longer a probabilistic encryption algorithm based on the existence of one-way functions as in [GM] or ]Yao86a], but rather a commitment algorithm computed as follows.

Let $\sigma_0, \sigma_1: \{0,1,2\} -> \{0,1,2\}$ be such that
(1) for all i, $\sigma_o(i)=i$,
(2) $\sigma_1(0)=0$, $\sigma_1(1)=2$ and $\sigma_1(2)=1$.

Let $m_k$ be the k-th bit to be committed to in the protocol.

To commit $m_k$:
- V chooses at random $c_k \epsilon \{0,1\}$ and sends $c_k$ to $P_1$.
- $P_1$ sets $E(c_k, m_k) = \sigma_c^k(r_k) + m_k$ mod 3, where $r_k \epsilon \{0,1,2\}$ is read off the random tap $P_1$ shares with $P_2$, and sends $E(c_k, m_k)$ to V.

To reveal the k-th bit committed in the protocol, V and $P_2$ engage in the following protocol.

To reveal the k-th bit:
- V sends k to $P_2$.
- $P_2$ sends V the string $r_k$.
- V computes $\sigma c_k(r_k)$ and sets $m_k$ to $(E(c_k, m_k) - \sigma c_k(r_k))$ mod 3.

Note: $P_2$ does not know $c_k$ and has never seen $E(c_k, m_k)$.

We prove two properties of the above pair of commit-reveal protocols. First since $P_2$ sees neither $E(c_k, m_k)$ nor $c_k$, but knows exactly what $P_1$'s program is, the probability that $P_2$ successfully reveals a bit value different than the one $P_1$ committed to is less than $\frac{1}{2}$.

Claim 1.1

$\forall r \epsilon \{0,1,2\}$, $m \epsilon \{0,1\}$, $$prob(r \text{ is s.t. } E(c,r,m) = E(c,\hat{r},\overline{m})) \leq \frac{1}{2}$$

Comment

To decrease the probability of successfuly cheating from $\frac{1}{2}$ to $\frac{1}{2}^n$, $P_1$ preform n commits to $m_k$ and $P_2$ preforms n reveals correspondingly. Knowing k, $E(c_k, m_k)$ and $c_k$ gives the verifier no advantage in guessing $m_k$.

Claim 1.2

$\forall c \epsilon \{0,1\}$, $$prob(m=0 | E(c,r,m)) = prob(m=1 | E(c,r,m)) = \frac{1}{2}$$

Proving now that the altered multi-prover Hamiltonian cycle protocol constitutes a two-prover interactive proof for the Hamiltonian cycle problem follows directly from [B1]'s proof and claim 1.

Proving that the protocol is perfect-zero-knowledge is more subtle.

To this end, we exhibit a probabilistic Turing machine M such that
- for Hamiltonian graphs G, M(G) terminates in expected polynomial time.
- for all $\hat{V}$ such that $(_1, P_2, \hat{V})$ is a two-prover protocol, and for all Hamiltonian graphs G, $M(G) = \text{View}_{P_1,P_2,\hat{V}}$ (where $P_1, P_2$ are honest provers as specified above.)

WLOG let the number of coin tosses of verifier and prover on input $G = (V, E)$ where $|V| = n$ be be bounded by polynomial $Q(n)$.

SIMULATOR M program: (tailored after steps 1-4 above in [B1]'s proof)

STEP 1

M chooses $\rho \epsilon \{0,1\}^{Q(n)}$ at random for the coin tosses to be used by $\hat{V}$. and sets $R = r_1 r_2 \ldots r_k \ldots$, $|R| \epsilon \{0,1\}^{Q(n)}$ where $r_k \epsilon \{0,1,2\}$ are chosen at random. ($\hat{V}(\rho,G)$ will denote the program $\hat{V}$ on input G and coin tosses $\rho$.) M picks a random permutation $\pi$ of the vertices of graph G to obtain the permuted graph $\hat{G}$ and an $n \times n$ random binary matrix MAT. Next, M simulates a commitment protocol to $\pi$ and MAT as follows. To simulate a commitment protocol to the k-th bit m: M runs $\hat{V}(\rho, G)$ to obtain c, computes $E(c,m) = \rho_{ck}(r_k) + m$ mod 3 for $r_k \epsilon R$, and writes $E(c,m)$ on $\hat{V}(\rho,G)$'s tape.

STEP 2

M continues running $V(\rho,G)$ to obtain coin.

STEP 3 if coin = 1, M reveals $\pi$ (as $P_2$ would do in real protocol) by writing the appropriate $r \epsilon R$ on $V(\rho,G)$'s tape. Revealing MAT to V is more involved, as follows. Let $\text{MAT} = \{m_{ij} | 1 \leq i,j \leq n\}$ and $\alpha = E(c,m_{ij}) = \rho_c(r) + m_{ij}$ mod 3 where $r \epsilon R$ is the r used in step 1 to commit $m_{ij}$. Let r be such that $\alpha = \rho_c(\check{r}) + \overline{m}_{ij}$ mod 3. Note that such r always exists and since M knows c (differently from $P_2$ in the real protocol) M can compute it. Set $$\check{r} = \begin{cases} r & \text{if } m_{ij} = 1 \text{ and } ij \text{ is an edge of } \hat{G}, \\ & \text{or } m_{ij} = 0 \text{ and } ij \text{ is not an edge of } \hat{G} \\ \hat{r} & \text{if } m_{ij} = 0 \text{ and } ij \text{ is an edge of } \hat{G}, \\ & \text{or } m_{ij} = 1 \text{ and } ij \text{ is not an edge of } \hat{G} \end{cases}$$

Then M reveals $\check{r}$ to $\hat{V}(\rho,G)$.

If coin = 0, M selects n ij entries at random in MAT such that no two entries are in the same column or in the same row. Set $$\check{r} = \begin{cases} r & \text{if } m_{ij} = 1 \\ \hat{r} & \text{if } m_{ij} = 0 \end{cases}$$

Where again $r \epsilon R$ from step 1 such that $\alpha = E(c,m_{ij}) = \rho_c(r) + m_{ij}$ mod 3, and $\hat{r}$ is such that $\alpha_{ij} = \rho_c(\hat{r}) + \overline{m}_{ij}$ mod 3. Next, M reveals $\check{r}$ to $V(\rho,G)$. Finally, M sets $\check{R}$ to be R with the values of $\check{r}$ substituted for r used to commit the matrix MAT.

STEP 4

M runs $\hat{V}$ to either accept or reject. It then outputs the transcript of its exchanges with $\hat{V}$ followed by $\check{R}$. DONE It is clear that, M on G operates in polynomial time in the running time of $\hat{V}$. Since $\hat{V}$ is assumed to be probabilistic polynomial time, so is M.

To show that the probability space generated by m is identical to that in $\text{View}_{(P_1, P_2, \hat{r})}$, we notice that for fixed $\rho$ (coin tosses of the verifier) and fixed R (joint random tape of $P_1$ and $P_2$) the output of $M(G)$ is identical to $\text{View}_{(P_1,P_2,\hat{r})}$. This is so as M actually runs $\hat{V}$ to obtain his moves and therefore $\hat{V}$'s moves are guaranteed to be perfectly simulated, while M itself follows the moves $P_1, P_2$ would have made on joint random tape $\check{R}$. since $\rho$ was picked by M at random at step 1, it remains to argue that the probability that $\check{R}$ was chosen by $P_1$ and $P_2$ is the same as the probability that $\check{R}$ was output by M. This is trivially true by claim 1.2. ∎

We claim, without proof here, that independent executions of the above protocol for any language $L \epsilon NP$ can be performed in parallel and the resulting protocol will still be a 2-prover perfect zero-knowledge proof-system for L.

In the 1-prover model the question of whether it is possible in general to preform parallel executions of perfect zero-knowledge protocols maintaining perfect zero-knowledge is unresolved. In particular, it is not known how to parallelize the proof-systems for quadratic residuosity and graph isomorphism.

5 Proof of Theorem 4: $IP_i = IP_2$ for all $k \geq 2$

We now show that any k-prover $(P_1, \ldots, P_k, V)$ interactive proof-system for language L can be converted into a 2-prover $(\hat{P}_1, \hat{P}_2, \hat{V})$ interactive proof-system. The idea is as follows.

Verifier $\hat{V}$ tosses all his coins and sends them to prover $\hat{P}_1$. In return, $\hat{P}_1$ sends $\hat{V}$ the entire history of communication that would have occured for theses coin tosses between the real verifier V and the k real provers $P_i$'s. If this is an accepting conversation for V, $\hat{V}$ now uses $\hat{P}_2$ to check the validity of the conversation. This is done by $\hat{V}$ selecting at random an original prover $P_i$, and simulating with $\hat{P}_2$ the conversation between V and $P_i$ on these coin tosses. If the conversation does not match the conversation sent by $\hat{P}_1$ then $\hat{V}$ rejects, otherwise the protocol is repeated k times (in series) and finally $\hat{V}$ accepts.

Note that the number of rounds in the simulating protocol is $k^2 t$, where t is the number of rounds in the k-prover interactive proof-system. Fortnow, Rompel and Sipser in [FRS] show that for each $L \epsilon IP_2$, there exists a 3-prover IPS for L with only a constant number of rounds.

Theorem 5

Let $k \geq 2$. If $L \epsilon IP_k$ then $L \epsilon IP_2$.

proof

Let L have a k-prover interactive proof-system $(P_1, \ldots, P_k, V)$. Let $I_k = \{1,2,\ldots k, \$\}$ and r denote the coin tosses made by the verifier. For a $w \epsilon L$, the optimal provers $P_1, \ldots, P_k$ and the verifier V can be though of as deterministic functions $P_i: \Sigma^* \to \Sigma^*$ and $V: \Sigma^* \times I_k \times \Sigma^* \cup \{\text{accept, reject}\}$ such that $y_i^i = P_i(h_{j-1} \# x_j^i)$ denotes the j-th message of the i-th prover to the verifier, $x_j^3 = V(r,i,h_{j-1}^1, \ldots, h_{j-1}^k)$ denotes the j-th message of the verifier to the i-th prover, and $h_j^i = \#x_1^i \# y_1^i \# \ldots \#x_j^i \# y_j^i$ denotes the history of communication as prover i sees it at round j. Let t the total number of rounds, then $V(r,\$,h_t^1, \ldots, h_t^k) \epsilon \{\text{accept, reject}\}$. Let Q be a polynomial such that $|r|, x_j^i|, |y_j^i| < Q|w|$.

We now define provers $\hat{P}_1$ and $\hat{P}_2$ and verifier $\hat{V}$ in the simulating two-prover protocol $\hat{P}_1, \hat{P}_2, \hat{V}$.

On input w,

STEP 1

$\hat{V}$ chooses $r \in \{0,1\}^{Q(|w|)}$ at ramdom, sends r to $\hat{P}_1$.

STEP 2

$\hat{P}_1$ sends $h_t^1, \ldots, h_t^k$ to $\hat{V}$ where the $h_t^i$'S are computed according to functions $P_1, \ldots, P_k$ and V. If $(V(r,\$,h_t^1, \ldots, h_t^k) = \text{reject}$ then $\hat{V}$ rejects and halts. Otherwise $\hat{V}$ picks $1 \leq i \leq k$ at random, sets $j=1$ and continues.

STEP 3

$\hat{V}$ sends $u_j^i = V(r,i,\hat{h}_{j-1}^i)$ to $\hat{P}_2$, where $\hat{h}_j^i = \#u_1^i\#v_1^i\# \ldots \#u_j^i\#v_j^i$ for $j \leq t$. if $j=t$ and $\hat{h}_t^i = h_t^i$ then V accepts and halts, otherwise $\hat{V}$ rejects and halts.

STEP 4

$\hat{P}_2$ sends $v_j^i = P_i(h_{j-1}^i\#u_j^i)$ to $\hat{V}$. Set $j = j+1$ and GOTO claim 5.1

$\forall w \in L$, prob($\hat{V}$ accepts w) = prob(V accepts w)

proof

If $P_i$ follow the protocol as described above and compute the $h_t^i$ according to the functions of the corresponding $P_i$'s, then for every sequence of coin tosses r on which V would accept so would $\hat{V}$.

Claim 5.2

If $w \not\in L$, prob($\hat{V}$ accepts w) $\leq$ (prob($\hat{V}$ accepts w) $+ e^{-k}$.

proof: sume $w \not\in L$. Then, the prob(V accepts w)$\leq$prob(V accepts w | $\forall i \leq k \forall j \leq t$, $y_j^i = \hat{P}_i(h_j^i - 1))$ + prob($\hat{V}$ accepts w $\exists$ 1, j s.t., $y_j^i \neq \hat{P}_i(h_j^i - 1)) \leq$ prob(V accepts w) + prob(V(r,\$,$h_t^1$, ..., $h_t^k$) = accept, and $\exists 1 \leq k$, s.t. $h_t^i \neq \hat{h}_t^i$, but i of step 4 is s.t. $h_t^i = \hat{h}_t^i) \leq$ prob(V accepts w) + (1 − k/l).

If the above protocol is repeated $k^2$ independent times, the probability of success is reduced to prob(V accepts w) + (1 − k/l)$^{k^2} \leq$ prob(V accepts w) + $e^{-k}$.

This completes the proof, and L is indeed in $IP_2$. ∎

6 Proof of Theorem 5: Completeness

Goldreich, Mansour and Sisper [GMS] showed that any $L \in IP$ has an interactive proof-system for which strings in L are always accepted. We show the corresponding property for any $L \in IP_2$.

Theorem 6:

If $L \in IP_2$, then there exists a 2-prover proof-system $(P_1, P_2, V)$ for L such that for all $x \in L$, prob(V accepts) = 1.

proof

Suppose $(P_1, P_2, V)$ is a 2-prover interactive proof-system for L such that $\epsilon = $ prob(V accepts | w not in L) and the number of coin tosses on input w which V makes is a polynominal $Q(|w|)$. We show a simulating 2-prover interactive proof-system $(\hat{P}_1, \hat{P}_2, \hat{V})$ for L which also achieves completeness. The simulation is done in two stages. In stage 1, we use the idea of the completeness proof for the 1-prover interactive proof-system model by Goldreich, Mansour and Sisper in [MGS] (based on Lautman's Lemma) where $\hat{P}_1$ plays the part of both $P_1$ and $P_2$. In stage 2, as in the proof of the theorem of section 6, $\hat{V}$ uses $\hat{P}_2$ to check the validity of stage 1.

Let t denote the number of rounds in $(P_1, P_2, V)$. Again, consider $P_1, P_2$ and V as deterministic functions as in the proof of theorem of section 6.

Let r denote the coin tosses of the verifier. For $i = 1, 2$, let $h_t^i(r) = \#x_1^i\#y_1^i\# \ldots \#x_t^i\#y_t^i$ where $x_j^i = V(r, i, h_{j-1}^i(r))$, and $y_j^i = P_i(h_{j-1}^i(r)\#x_j^i)$.

Define $W = \{r | V(r, \$, h_t^1, h_t^2) = \text{accept}\}$. Note that for $w \in L$, $$\frac{|W|}{2^{Q(|\omega|)}} \geq (1 - \epsilon)$$

and for w not in $$L \frac{|W|}{2^{Q(|\omega|)}} \leq \epsilon.$$

Lautman[L] shows that $\forall w \in L \exists s_1, \ldots, s_{Q(|\chi|)}$, $|s_i| = Q(|\chi|)$, $s_i| = Q(|\chi|)$, s.t. $\forall r$, $|r| = Q(|\chi|)$, 1 s.t. r $\oplus s_1 \in W$. We use this in a manner similar to [GMS]. On input w,

STEP 1

$\hat{P}_1$ sends V $s_1, \ldots, s_{Q(|w|)}$ such that $s_i \in \{0, 1\}^{Q(|w|)}$;

STEP 2

$\hat{V}$ sends r to $\hat{P}_1$ where r is randomly selected in $\{0, 1\}^{Q(|w|)}$.

STEP 3

$\hat{P}_1$ sends to $\hat{V}$, $h_t^i(s_j \oplus r)$ for $i = 1, 2$ and $1 \leq j \leq Q(|w|)$. (These are the histories of conversations which would have been exchanged in original protocol $(P_1, P_2, V)$ on coin tosses $r \oplus s_j$, $1 \leq j \leq Q(|w|)$.)

STEP 4:

if $V(r \oplus s_j, h_t^1(r \oplus s_j), h_t^2(r \oplus s_j)) = $ reject for all $1 \leq j \leq k$, then $\hat{V}$ rejects. If $\exists 1$ s.t. $V(r \oplus s_l, h_t^1(r \oplus s_l), h_t^2(r \oplus s_l)) = $ accept, then goto STEP 5.

STEP 5

$\hat{V}$ chooses $i \in \{1, 2\}$ at random. It then interacts with prover $\hat{P}_2$ in the same way that V and $P_i$ would have on coin tosses $r \oplus s_l$. If this interaction produces exactly the same history string $h_t^i(r \oplus s_l)$ sent by $\hat{P}_1$ in STEP 3 then $\hat{V}$ accepts, otherwise it rejects.

The above protocol is repeated $Q(|w|)$s times, and the verifier accepts if and only if he accepted in any of these iterations.

Claim 1 prob(V accepts $|w| \in L$) = 1 proof if $\hat{P}_1$, and $\hat{P}_2$ follow the program outlined above, follows directly from [L] and [GMS].

Claim 2 prob(V accepts $|w|$ not in L) $\leq \frac{1}{3}$ proof

We now can not assume that $P_1, P_2$ follow the procotol. Let $h_{ij}$, for $i = 1, 2$, $1 \leq j \leq Q(|w|)$ denote the strings sent by $\hat{P}_1$ in STEP 3.

prob(V accepts in one iteration $|w \notin L) \leq \Sigma_i$prob($\exists$ 1, V($r \oplus s_l$, $h_{1l}$, $h_{2l}$)=accept$|\hat{P}_1$, $\hat{P}_2$ honest)+prob($P_1$, $P_2$ not caught in step 5 but $\exists$ j, i, $h_i^i(r \oplus s_j) \neq h_{ij}) \leq Q(|w|)$.

$$\epsilon + \left(1 - \frac{1}{2Q(|\omega|)}\right) = 1 - \frac{1}{2Q(|\omega|)} + Q(|\omega|) \cdot \epsilon$$

Now, prob(V accepts in $Q(|w|)^3$ iterations $|w \notin L) =$ $$\left(1 - \frac{1}{2Q(|\omega|)} + Q(|\omega|) \cdot \epsilon\right)^{Q(|\omega|)^3}$$

which is less than a ⅓ for $\epsilon$ sufficiently small.
QED

7 Proof of Theorem 2: Outline

Overview

The proof of Theorem 2 is very long and complicated. The main idea of the proof is the implementation of a technique we call encrypted conversations. This is a general technique for transforming proof systems into zero-knowledge proof systems. A protocol that has been transformed using this technique closely mirrors the original protocol. Indeed, all the questions and answers of the transformed protocol can be mapped to questions and answers in the original protocol. However, these questions and answers are all strongly encrypted, in an information theoretic sense, using keys that are known by the provers, but not by the verifier. Because the conversation is so strongly encrypted, the verifier gets no information, so the protocol is zero-knowledge.

Two concerns such a transformation must deal with are
- How can the verifier, who in a strong sense knows little of what has happened in an encrypted conversation, be convinced that the conversation indeed mirrors a valid conversation from the original protocol? Also, how can the verifier be convinced that the unencrypted conversation would indeed have caused the original verifier to accept?
- How can one insure that a malicious verifier cannot subvert the encrypted protocol in order to acquire information in some way?

We deal with the first concern by showing how the provers and verifier can take an encrypted transcript of the first i rounds of a conversation, and compute an encrypted transcript of the first i+1 rounds of a conversation. This is done in such a way that the verifier can verify with high probability that this is the case. We dealwith the second concern by insuring that the encrypted conversation, if generated at all, will mirror a conversation between the prover and an honest verifier. Thus, if the verifier follows the simulation, he will only find out whether the original verifier, on a random set of coin tosses, accepted. Since the original verifier accepts with probability 1, this is no information. Furthermore, we guarantee that if the verifier does not go along with the simulation, he will not get any information.

In order to accomplish these goals, we use a very useful tool called oblivious circuit computation. This tool, first developed by Yao [Yao86a], is a protocol by which two parties, A and B, possess secrets i and j respectively, and have agreed upon some circuit f. At the end of the protocol, A learns nothing about j, and B learns f(i, j), but nothing more about i than can be inferred from knowing j and f(i, j). The provers and verifier can compute the next step of an encrypted conversation by obliviously evaluating a circuit. We sketch the reduction from encrypted conversations to oblivious circuit evaluation in appendix A.3.

A large portion of our construction is devoted to implementing oblivious circuit evaluation. Yao's implementation of this protocol relies on complexity theoretic assumptions, and is therefore unsuitable for our purposes. More recently, however, this protocol was implemented using a subprotocol known as oblivious transfer in lieu of any cryptographic assumptions [K]. In the standard, two-party scenario, oblivious transfer cannot be implemented without complexity theoretic assumptions. However, we show that oblivious transfer can be implemented in the two-prover scenario without recourse to these assumptions. Our implementations uses a result of Barringtion [Ba] that $NC^1$ languages can be accepted by bounded width branching programs. We sketch our implementation in appendix A.2.

A Structure of the Transformed Protocol

Given a 2-prover IPS, we transform it into a zero-knowledge 2-prover IPS that has three distinct phases. These stages will be referred to as the commital phase, the oblivious transfer phase, and the encrypted conversation phase. In the commital phase of the protocol, the two provers commit a set of bits to the verifier. In the oblivious transfer phase of the protocol, the provers and verifier create a random sequence O of oblivious transfer bits. Sequence O has the following three properties.
- All of the bits of O are known to the provers.
- Each bit in O is known to the verifier with probability ½.
- Neither prover knows which bits in O the verifier knows.

The third and final stage actually simulates the original 2 prover IPS. In this stage, sequence O is used to perform oblivious circuit computation, which then allows the use of the encrypted conversation technique. We now describe the three phases in greater detail.

A.1 The Commital Phase.

It is necessary for the two provers to be able to commit bits for use in the second, oblivious transfer phase of the protocol. This commital is of the same type as in the proof that any language in NP has a zero-knowledge 2-prover IPS. We use the same commital protocol as is used in Section 5.

The bits committed to in the commital phase may be random. In order to commit a bit b in the oblivious transfer phase, a prover can tell the verifier the value of $b \oplus b_c$, where $b_c$ is a bit committed to in the commital phase. To decommit b, the prover can then simply decommit $b_c$.

A.2 The Oblivious Transfer Phase.

The oblivious transfer phase of the zero-knowledge IPS consists of several parallel evaluations of the oblivious transfer protocol, described below.

Introduction to Oblivious Transfer

We can view oblivious transfer as a protocol between two parties, A and B. Initially, A knows some random bit b, which is unknown to B. At the end of the protocol, the following two conditions hold.

1. (The Transfer Condition) One of the following two events has occured, each with probability ½. Either B learns the value of b, or B learns nothing. Player B knows which of the two events occurred.

2. (The Obliviousness Condition) Player A receives no information about whether or not B learned the value of b.

Oblivious transfer, first introduced by Rabin[R], is a powerful cryptographic primitive. Its applications include contract signing [EGL] and oblivious circuit evaluation ([Y], [GMW2], [GHY], [AF], [GV], [K]). The first implementation of oblivious transfer by Rabin [R] was based on the difficulty of factoring and only worked for honest parties, Fischer, Micali, and Rackoff[FMR] presented the first implementation based on factoring and robust against computationally bounded adversaries. Even-Goldreich-Lempel[EGL] reduced the intractibility assumption to the existence of trapdoor permutations.

Unfortunately, these reductions are all cryptographic in nature, and thus of no use to us. Our implementation, which is not based on any cryptographic assumptions, exploits the lack of direct communication between the two provers.

A Variant of Oblivious Transfer in the 2-Prover Model.

We implement an analog to oblivious transfer in the two-prover model. At the beginning of the protocol, the provers know(have chosen) some random bit b, which the verifier does not know. The provers and the verifier have also agreed on a security parameter K. At the end of the protocol, the following variants of the usual transfer and obliviousness conditions hold.

1. (The Transfer Condition) One of the following events occurs with probability ½. Either the verifier ffully learns the value of b (i.e. can predict b with probability 1), or the verifier gains only partial knowledge of b (i.e. can predict b with probability ¾). The verifier knows which of the two events occurred.

2. (The Obliviousness Condition) Let K denote the security parameters. For all $c>0$, and for K sufficiently large, if the two provers communicate less than K bits of information, they cannot predict, with probability $\frac{1}{2} + 1/K^c$, whether the verifier fully learned b.

Our implementation of this oblivious transfer protocol requires a constant number of rounds. The total number of bits of communication between the provers and the verifier will by polynominal in K and the size of the input.

Both the transfer and the obliviousness conditions are relaxed versions of the standard ones. The transfer condition is relaxed purely for ease of implementation. Using the techniques of Crépeau-Kilian[CK], we can show that achieving this weakened transfer condition is equivalent to achieving the ideal transfer condition. The standard obliviousness condition, however, cannot be implemented in this model if the two pprovers are allowed to freely communicate. To get around this difficulty, we show that for interactive proof systems, a set of bits transferred under the nonideal obliviousness condition may be used in place of a set of bits transferred under the ideal obliviousness condition.

Branching programs

The main idea behind the oblivious transfer protocol is a simulation of width 5 permutation branching programs(W5PBP), as defined in [B]. Before describing the protocol, we first present a slightly nonstandard way to specify a W5PBP. We then show a way of randomizing this specification. Using this randomized representation, we can then describe our oblivious ransfer protocol.

W5PBP's may be formally thought of as having some polynominal p(n) levels, each with five nodes. On level 1 there is a distinguished start node s; on level p(n) there is a distinguished accept node a. For each level, i, $1 \leq i < p(n)$, there is an input variable, which we denote by $v_i$, and two 1—1 mappings, $f_0^i$ and $f_1^i$ that map the nodes at level i to the nodes at level i+1. Intuitively, the mapping $f_0^i$ tells where to go if the input variable $v_i$ is 0, and $f_1^i$ tells where to go if $v_i$ is equal to 1. A branching program may be evaluated by on a set of inputs by computing $$\text{Branching\_Program}(x_1, \ldots, x_n) = \quad (A.2.1)$$

$$(f_{v_{p(n)}-1}^{p(n)-1} \circ f_{v_{p(n)}-2}^{p(n)-2} \circ \ldots \circ f_{v_1}^{1})(s).$$

Figure 1A:
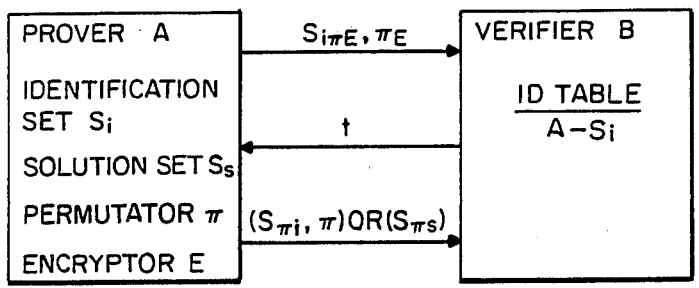

If this value if equal to the accept node a, the branching program accepts, otherwise, it is rejects. An example of a program is in FIG. 1.

As described above, our branching programs consist of variables, nodes, and functions from nodes to nodes. For our protocol, we need an alternate representation for branching programs. Given a W5PBP, we first pick a random mapping $\gamma$, that maps nodes to $\{1, \ldots, 5\}$, subject to the constraint that no two nodes on the same level are mapped to the same number. We then replace each function $f_k^i$, $k \in \{0, 1\}$, by a permutation $h_k^i$, subject to the constraint $$h_k^i(\gamma(N)) = \gamma(f_k^i(N)), \quad (A.2.1)$$

for all nodes N on level i. From equations (A.2.1) and (A.2.2) we have $$\gamma(\text{Branching\_Program}(x_1, \ldots, x_n)) = \quad (A.2.3)$$

$$(h_{v_{p(n)}-1}^{p(n)-1} \circ h_{v_{p(n)}-2}^{p(n)-2} \circ \ldots \circ h_{v_1}^{1}(\gamma(s))).$$

This isomorphism between evaluating the permutations $h_k^i$ on $\gamma(s)$ and evaluating the original branching program proves very useful in implementing oblivious transfer, as we will show in the next section. The following simple lemma is useful in analyzing the information transferred by the oblivious transfer protocol we will present.

Lemma A.1

Suppose that for each level, i, of a branching program, exactly one of the functions $h_0^i$ or $h_1^i$ is specified. Suppose also that for some level j, $\gamma(N)$ is specified for all nodes N on level j. Then there is exactly one way of consistently defining $\gamma$ and the functions $h_k^i$.

Proof Outline

First, we note that specifying $\gamma$ specifies all the h's. Thus we need only show that there is exactly one way of consistently defining $\gamma$. By equation A.2.2, we have $$\gamma(N) = h_k^{i-1}(\gamma(f_k^i(N))), \text{ and} \quad (A.2.4)$$

$$\gamma(N) = h_k^i(\gamma(f_k^{i-1}(N))). \quad (A.2.5)$$

If $\gamma$ is defined on level i, equation(A.2.4) uniquely extends it to level i−1, and equation (A.2.5) uniquely extends it to level i+1. Inductively, one can uniquely extend $\gamma$ from row j to the entire branching program. This extension is easily shown to be consistent. ∎

The oblivious transfer protocol

We now outline the oblivious transfer protocol between the two provers and the verifier. For the exposition, we assume that the provers follow the protocol. It is not hard to convert this protocol to one that works with adversarial provers.

Stage 1

Let $n=K^2$. Both provers initially start with some canonical W5PBP that, given two vectors $\vec{x}=[x_1\ x_2\ \ldots\ x_n]$ and $\vec{y}=[y_1\ y_2\ \ldots\ y_n]$, accepts iff $\vec{x}\cdot\vec{y}=1$. They then agree on a random mapping $\gamma$, and permutations $h_{k}^i$. The provers send the verifier the exclusive-or of b and the least significant bit of $\gamma(a)$.

Stage 2

The verifier and Prover 1 pick a random vector x. The verifier and Prover 2 pick a random vector y. As a subprotocol, the prover and verifier flip an unbiased coin in the following manner: Prover i chooses as his bit, $r_p$, one of the bits committed in the commital phase of the protocol. The verifier chooses a bit $r_v$ at random, and announces it to Prover i. Prover i then decommits $r_p$. The bit r, defined by $r=r_p\oplus r_v$ will be unbiased if either Prover i or the verifier obeys the protocol.

Stage 3

Prover 1 sends the verifier the permutations $h_v^i$, for all i such that $v_i=x_j$ for some j. Likewise, Prover 2 sends the verifier the permutations $h_v^i$, for all i such that $v_i=y_j$ for some j. For example, if $v_i=y_7$, and $y_7=0$, then Prover 2 would send the verifier $h_0^i$, but not send him $h_1^i$.

We now show how to convert this protocol to one in which the provers may be adversarial. First, we require that the provers commit their $\gamma$ and their permutations $h_0^i$ and $h_1^i$ at Stage 1 of the oblivious transfer protocol, using the commital protocol described in section 1. The verifier must be assured that the following two conditions are met.

1. The permutations it receives correspond to those that have been committed, and
2. The permutations and $\gamma$ correspond to a legitimate randomized branching program.

The first condition is assured by having the provers decommit their permutations in Stage 3 of the protocol. To assure that the second condition is met, we have the verifier perform a "spot-check" with probability $1/n^c$, where n is the size of the input, and c is some positive constant. To perform a spot-check, the verifier halts the oblivious transfer protocol at the beginning of Stage 2. Instead of using the committed W5PBP to implement oblivious transfer, the verifier requests that $\downarrow$ and all the hash functions are revealed. The verifier can then check whether or not the two provers gave a legitimate randomized W5PBP, and reject if they did not. Note that it is only necessary for the verifier to be able to detect cheating by the provers some polynominal fraction ofthe time. This probability may be amplified by successively running the zero-knowledge proof system sufficiently many times.

Properties of the Oblivious Transfer Protocol

The following theorems state that the above protocol does indeed implement out variant of oblivious transfer.

Theorem (Transfer) After the above protocol has been executed, one of the following two events may occur, each with probability $\frac{1}{2}$.

(1) The verifier knows the value of b.
(2) The verifier can guess the value of b with probability at most $\frac{3}{4}$.

Furthermore, the verifier can tell which event occurred.

Proof Outline

Suppose, that $\vec{x}\cdot\vec{y}=1$. Then the verifier can compute $\gamma(a)$, and thus compute b. This corresponds to event (1). Now suppose that $\vec{x}\cdot\vec{y}\neq 1$. The verifier knows, for each level i, exactly one of the functions $h_0^i$ or $h_1^i$. The verifier can also compute $\gamma(a')$, where a' is also on the last level, and a'$\neq$a. Everything else the verifier knows can be computed from this information. Using Lemma 1, we have that any specification of $\gamma$ on the top level nodes can be consistently extended in exactly one way. Thus, the verifier has no information about $\gamma(a)$ other than the fact that $\gamma(a)\neq\gamma(a')$. The verifier's predictive ability is maximized when $\gamma(a')$ is even, in which case the conditional probability that $\gamma(a)$ is odd is $\frac{3}{4}$. In this situation, the verifier can predict b with probability $\frac{3}{4}$. ∎

Theorem (Obliviousness) Let c be a constant, $c<0$, and K, the security parameter, be sufficiently large (possibly depending on c). If, after the above protocol has been executed, the two provers exchange only K bits of information, they cannot predict, with probability $\frac{1}{2}+1/K^c$, whether the verifier received the bit.

Proof Outline

We again use the observation that the verifier receives a bit iff the dot product of the two randomly chosen vectors is equal to 1. Determining if the verifier received the bit is equivalent to computing the dot product of two random vectors of size n. We now cite a theorem of Chor and Goldreich [CG] concerning the communication complexity of computing dot products.

Theorem[CG]

Let players A and B each receive random n bit boolean vectors, x and y respectively. If they exchange o(n) bits, they cannot predict x·y with probability greater than $\frac{1}{2}+1/n^c$, for any c.

Our theorem follows directly from this result.

Ideal versus Nonideal Oblivious Transfer Bits

As we have mentioned above, the oblivious transfer protocol we implement is nonideal in the obliviousness conditions. The nonideal nature of the obliviousness condition is inherent to our model, if the transfer condition is indeed ideal in the information theoretic sense. If the two infinitely powerful provers are allowed to communicate freely, they can each learn the entire transcript of the oblivious transfer protocol, and thus determine everything the verifier could have learned from the protocol. This violates the obliviousness condition of oblivious transfer, yielding the following observation.

Observation

It is impossible to implement an ideal oblivious transfer protocol between two provers and a verifier if the provers are allowed to communicate freely after the protocol.

The nonideal nature of the oblivious condition does not affect whether a protocol is zero-knowledge; the verifier learns exactly as much from a pseudo-oblivious source as from an oblivious one. However, using a pseudooblivious source of bit instead of an ideal source could conceivably cause a protocol to no longer be a proof system. We show that, provided the security parameter for our pseudo-oblivious source is sufficiently high, this will not be the case.

Formalizing Proof Systems with Oblivious Transfer Channels

In order to state our result more precisely, we first augment our definition of two-prover interactive proof systems by adding a fourth party, a transfer source.

Definition

A two-prover interactive protocol with oblivious transfer consists of a four-tuple of parties, $<P_1, P_2, V, T>$. Parties $P_1, P_2, V$ may be formally described as mappings from sequences of $\Sigma^*$ (informally, the history of that party's conversation so far) to distributions on $\Sigma^*$ (informally, the next answer/question given/asked by the party).

Player T may be formally described as a mapping form $\{0, 1\}^*$ to a distribution on triples $(I_{P1}, I_{P2}, I_V)$. The values $I_{P1}, I_{P2}$ may be informally thought of as information leaked back to the provers, $P_1$ and $P_2$, by a possibly nonideal oblivious transfer protocol. The possible values of $I_V$ on input $O=O_1, \ldots, O_k$ are elements of $\{0, 1, \#\}^*$, of the form $O'_1 \ldots O'_k$, where $O'_i=O_i$ or $O'_i=\#$. Informally, $I_V$ consists of the bits that are transferred to the verifier, V.

For the rest of the discussion, we will anthromorphize our descriptions of the $P_1, P_2, V$ and T, describing their behavior in terms of actions by players instead of as values of functions.

Protocols with oblivious transfer are evaluated in nearly the same way as standard protocols, but for an initial oblivious transfer phase. At the beginning of the protocol, the provers, $P_1$ and $P_2$, agree on a sequence of bits O, which they send to the transfer mechanism, T. The transfer mechanism sends some of these bits to the verifier, and sends additional information back to the two provers. At this point, T no longer plays any part in the protocol, and the players $P_1, P_2,$ and V proceed to interact in the same manner as with standard two-prover protocols. Players $P_1, P_2,$ and V treat their views of the oblivious transfer phase as special inputs.

Modeling ideal and nonideal sources in our formalism

We now give a specification for an oblivious transfer mechanism which models the information received by the provers by the actual oblivious transfer mechanism we have implemented in the two-prover model.

Specification

Oblivious transfer mechanism $T_{n,k}$ is specified by its input from the provers and its output to the provers and the verifier. $T_{n,k}$ takes as input a sequence of bits $O=O_1, \ldots, O_k$. It flips k coins, $b_1, \ldots, b_k$. $T_{n,k}$ randomly selects two sequences of n element boolean vectors, $\vec{x}_1, \ldots, \vec{x}_k$ and $\vec{y}_1, \ldots, \vec{y}_k$, subject to $\vec{x}_i \cdot \vec{y}_i = b_i$. $T_{n,k}$'s output is as follows.

Transfer to V $T_{n,k}$ sends the verifier sequence $O'=O_1', \ldots, O_k'$ where $O_i'=O_i$ iff $b_i=1$. Otherwise, $O_i'=\#$.

Transfer to $P_1$ $T_{n,k}$ sends $P_1$ the sequence $\vec{x}_1, \ldots, \vec{x}_k$.

Transfer to $P_2$ $T_{n,k}$ sends $P_2$ the sequence $\vec{y}_1, \ldots, \vec{y}_k$.

This model for our transfer channel makes the following simplifications. The verifier does not get any partial glimpses at bits that it hasn't completely received, whereas in the actual protocol, it may guess it with probability 3/4. Also, it does not get any record of its interactions with the provers in the oblivious transfer protocol. For instance, in the actual protocol, the verifier would also known $x_i$'s and $y_i$'s, whereas in this model it does not. These simplifications turns out to be irrelevant to our analysis, since the valid verifier completely disregards all of this extra information.

More significantly, the provers do not receive any of the extra information they might obtain in the commital and oblivious transfer phases. One can show that any pair of provers which have any chance of fooling the verifier must abide by rules of the commital and oblivious transfer protocols. The extra information they receive from an honest run of these protocols is of no value to them. They may, in a certain technical sense, simulate all of this extra information, once given their respective vector sequences $\vec{x}_1, \ldots, \vec{x}_k$ and $\vec{y}_1, \ldots, \vec{y}_k$. Thus, the provers cannot cheat any more effectively using our simplified channel than they could using the actual commital and oblivious transfer protocols. The details of this argument are ommitted.

Modeling an ideal oblivious transfer mechanism

It is fairly straightforward to model an ideal oblivious transfer mechanism in our formalism. We denote this transfer channel $T_k^{ideal}$, which we specify as follows.

Specification

Oblivious transfer mechanism $T_k^{ideal}$ is specified by its input from the provers and its output to the provers and the verifier. $T_k^{ideal}$ takes as input a sequence of bits $O=O_1, \ldots, O_k$. It flips k coins, $b_1, \ldots, b_k$. It randomly selects two sequences of n element boolean vectors, $\vec{x}_1, \ldots, \vec{x}_k$ and $\vec{y}_1, \ldots, \vec{y}_k$. $T_k^{ideal}$'s output is as follows.

Transfer to V $T_k^{ideal}$ sends the verifier sequence $O'=O_1', \ldots, O_k'$ where $O_i'=O_i$ iff $b_i=1$. Otherwise, $O_i'=\#$.

Transfer to $P_1$ and $P_2$ $T_k^{ideal}$ sends nothing to $P_1$ or $P_2$.

A practical equivalence between $T_{n,k}$ and $T^{ideal}$

We can now state our theorem concerning the the practical equivalence of our oblivious transfer protocol and the ideal one.

Theorem

Let $<P_1, P_2, V, T_{p(n)}^{ideal}>$ be an interactive proof system with oblivious transfer. Here, p(n) denotes some polynomial in the size of the input. Then there exists some some polynomial q(n) such that $<P_1, P_2, V, T_{q(n),p(n)}>$ is also an interactive proof system with oblivious transfer.

Brief Outline of Proof

The proof of this theorem is somewhat involved. We show that if one could cheat more effectively using a $T_{q(n),p(n)}$ transfer channel, for $q(n)$ arbitrarily large, then one could use this fact to create a protocol for computing the dot product of two random $q(n)$ element boolean vectors. The communication complexity for this protocol will depend on V and n, but not on the function q. From this it is possible to use the Chor-Goldreich lower bound on the communication complexity of boolean dot product to reach a contradiction.

In order to construct the protocol for computing boolean dot products, we first define a sequence of transfer mechanisms that are intermediate between our nonideal and ideal transfer mechanisms. We show that if the provers can cheat using the nonideal transfer mechanism, then two consecutive transfer mechanisms in our sequence can be distinguished. We then show how to use these transfer mechanisms to generate two very simple and very similar transfer mechanisms whose behavior is distinguishable. Finally, we use the distinguishability of this final air of transfer mechanisms to create a protocol for boolean dot-product. We proceed to formalize this argument.

Transfer mechanism that are intermediate between the ideal and nonideal models We specify a sequence of oblivious transfer mechanisms as follows.

Specification

Oblivious transfer mechanism $T_{n,k}^i$ is specified by its input from the provers and its output to the provers and the verifier. $T_{n,k}^i$ takes as input a sequence of bits $O = O_1, \ldots, O_k$. It flips k coins, $b_1, \ldots, b_k$. $T_{n,k}^i$ randomly selects two sequences of n element boolean vectors, $\vec{x}_1, \ldots, \vec{x}_k$ and $\vec{y}_1, \ldots, \vec{y}_k$. For $1 \leq j \leq i$, vectors $x_j$ and $y_j$ are subject to the constraint $\vec{x}_i \cdot \vec{y}_i = b_j$. $T_{n,k}^i$'s output is as follows.

Transfer to V $T_{n,k}^i$ sends the verifier a sequence $O' = O_1', \ldots, O_k'$ where $O_i' = O_i$ iff $b_i = 1$. Otherwise, $O_i' = \#$.

Transfer to P1

$T_{n,k}^i$ sends P1 the sequence $\vec{x}_1, \ldots, \vec{x}_k$.

Transfer to P2

$T_{n,k}^i$ sends P2 the sequence $\vec{y}_1, \ldots, \vec{y}_k$.

The only difference between $T_{n,k}$ and $T_{n,k}^i$ is that the vectors sent to the provers by $T_{n,k}$ all have some correlation with whether the bit was sent to the verifier, whereas only the first i vectors sent to the provers by $T_{n,k}^i$ are so correlated. Note that $T_{n,k}^0$ is equivalent to the ideal channel $T_k^{ideal}$, and $T_{n,k}^k$ is equivalent to $T_{n,k}$.

Analysis of cheating probabilities for different transfer mechanisms

The sequence of oblivious transfer mechanisms we defined above is "continuous" in that any two consecutive mechanisms are only incrementally different from each other. Using an argument similar to that of [GM], we show that if the probability of successfully cheating using one transfer mechanism in the sequence is significantly greater than the probability of successfully cheating using a different transfer mechanism in the sequence, then there must be two consecutive mechanisms which differ in the probability of a particular cheating strategy being successful.

Definition

Let L be some language, and $<P_1, P_2, V, T_{p(n)}^{ideal}>$ a two-prover IPS for L, with oblivious transfer. For some $x \in L$, $|x| = n$, we define $\text{cheat}_{ideal}(x)$ as the probability that V can be tricked into accepting x.

We wish to analyze how frequently the provers can cheat if they use a nonideal transfer mechanism, $T_{q(n),p(n)}$. Let $P_{1,q(n)}, P_{2,q(n)}$ be optimal cheating provers for the protocol $<P_{1,q(n)}, P_{2,q(n)}, V, T_{q(n),p(n)}>$. For $x \in L$, $|x| = n$, we define $\text{cheat}_{q(n)}^i(x)$ as the probability that $P_{1,q(n)}, P_{2,q(n)}$ causes V to accept x in protocol $<P_{1,q(n)}, P_{2,q(n)}, V, T_{q(n),p(n)}^i>$. Clearly, we have $\text{cheat}_{q(n)}^0(x) \leq \text{cheat}_{ideal}(x)$. We also have, by definition, that $\text{cheat}_{q(n)}^{p(n)}(x)$ is the maximum probability that any provers can trick V into accepting x, using transfer mechanism $T_{q(n),p(n)}$.

Using a simple pigeonhole argument, we can show the following.

Lemma A.2

Let $x \notin L$, and $|x| = n$. For all polynominals $q(n)$, there exist some i, $0 \leq i < p(n)$, such that $$\text{cheat}_{q(n)}^{i+1}(x) - \text{cheat}_{q(n)}^i(x) \geq \frac{\text{cheat}_{q(n)}^{p(n)}(x) - \text{cheat}_{q(n)}^0(x)}{p(n)}. \quad (A.2.6)$$

We now show that if for for all polynomials $q(n)$, there exists a $c > 0$, such that $\text{cheat}_{q(n)}^{i+1}(x) - \text{cheat}_{q(n)}^i(x) > 1/|x|^c$ for infinitely many x, then we can create efficient algorithms for computing dot products of random vectors. To do this, we first must introduce the notion of "hardwired" versions of transfer mechanisms $T_{q(n),p(n)}^i$.

Restricted versions of oblivious transfer mechanisms

Given two easily distinguishable mechanisms $T_{q(n),(n)}^i$ and $T_{q(n),p(n)}^{i+1}$, we would like to create even simpler pairs of mechanisms that are easily distinguishable, yet preserve the essential differences between $T_{q(n),p(n)}^i$ and $T_{q(n),p(n)}^{i+1}$. We observe that the only difference between these two mechanisms lies in the distibutions imposed on the vectors $\vec{x}_{i+1}$ and $\vec{y}_{i+1}$ which are sent to $P_{1,q(n)}$ and $P_{2,q(n)}$. We would like to be able to fix all the other aspects of these channels. To do this, we make the following definitions.

Definition

A transfer restriction $R \in R_{n,k}^i$ is a 3-tuple $(R_b, R_x, R_y)$, where

- $R_b$ is a sequence of bits, $b_1, \ldots, b_k$.
- $R_x$ is a $k-1$ element sequence of n element boolean vectors, $\vec{x}_1, \ldots, \vec{x}_{i-1}, \vec{x}_{+1}, \ldots, \vec{x}_k$.
- $R_y$ is a $k-1$ element sequence of n element boolean vectors, $\vec{y}_1, \ldots, \vec{y}_{i-1}, \vec{y}_{i-1}, \ldots, \vec{y}_k$.

Furthermore, we require that for $1 > j < i$, $\vec{x}_i \cdot \vec{y}_j = b_j$.

Intuitively, we can think of $R \in R_{n,k}^i$ as a specification for which bits get through to the verifier, and, except fot the ith bit, specifications for which vectors are transmitted back to the provers.

Definitions

Given a transfer restriction $R \epsilon R_{n,k}{}^i$ We specify a restricted version of $T_{n,k}{}^i$ which we denote by $T_{n,k}{}^i[R]$, as follows.

Specification

Oblivious transfer mechanism $T_{n,k}{}^i[R]$ takes as input a sequence of bits $O=O_1, \ldots, O_k$. Let $R_b=b_1, \ldots, b_k$, $R_x=\vec{x}_1, \ldots, \vec{x}_{i-1}, \vec{x}_{i+1}, \ldots, \vec{x}_k$, and $R_y=\vec{y}_1, \ldots, \vec{y}_{i-1}$, $\vec{y}_{i+1}, \ldots, \vec{y}_k$. $T_{n,k}{}^i[R]$ randomly selects two n element boolean vectors, $\vec{x}_j$ and $\vec{y}_j$. If $j \leq i$, then $\vec{x}_j$ and $\vec{y}_j$ are chosen s.t $\vec{x}_j \cdot \vec{y}_j = b_j$. $T_{n,k}{}^i[R]$'s output is as follows.

Transfer to V $T_{n,k}{}^i[R]$ sends the verifier sequence $O_1', \ldots, O_k'$ where $O_i' = O_i$ iff $b_i = 1$. Otherwise, $O_i' = \#$.

Transfer to $P_1$ $T_{n,k}{}^i[R]$ sends $P_1$ the sequence $\vec{x}_1, \ldots, \vec{x}_k$.

Transfer to $P_2$ $T_{n,k}{}^i[R]$ sends $P_2$ the sequence $\vec{y}_1, \ldots, \vec{y}_k$.

Analysis of cheating with respect to restricted transfer mechanisms

Recall that provers $P_{1,q(n)}$ and $P_{2,q(n)}$ cheat optimally, given oblivious transfer mechanism $T_{q(n),p(n)}$. We would like to described what happens when these provers are run using restricted transfer mechanisms. To this end, we define $cheat_{q(n)}{}^i[R](x)$ as the probability that $P_{1,q(n)}$, $P_{2,q(n)}$ causes V to accept x in protocol $<P_{1,q(n)}, P_{2,q(n)}, V, T_{q(n),p(n)}{}^i[R]>$.

Using a simple probabilistic argument, we prove the following important lemma.

Lemma A.3

Let $x \notin L$, and $|x|=n$. Let $1 \leq i < p(n)$. For all polynomials q(n), there exists a restriction $R \epsilon R_{q(n),p(n)}{}^{i+1}$ such that $$cheat_{q(n)}^{i+1}[R](x) - cheat_{q(n)}^{i}[R](x) \geq cheat_{q(n)}^{i+1}(x) - cheat_{q(n)}^{i}(x). \quad (A.2.7)$$

Using $T_{q(n),p(n)}{}^i[R]$, $T_{q(n),p(n)}{}^{i+1}[R]$ to compute dot products Recall that a restriction $R \epsilon R_{q(n),p(n)}{}^{i+1}$ defines the entire input/output properties of a restricted transfer protocol $T_{q(n),p(n)}{}^i[R]$, but for the output vectors $\vec{x}_i, \vec{y}_i$ transmitted back to the provers. If the two provers have a source $M_{q(n)}$, which produces vector pairs $\vec{x},\vec{y}$, of size q(n) and sends them to Prover1 and Prover2, respectively, we can use it to stimulate $T_{q(n),p(n)}{}^i[R]$.

We also note that, if allowed to communicate directly, two provers can "simulate" the verifier in the following way. They can send to each other the messages they would have sent to the verifier. By knowing the set of transfer bits, which bits were received by the verifier, and a transcript of the conversation so far between the verifier and the provers, the provers can determine exactly what the verifier's next question in the conversion will be.

We now can explicitly write down a protocol for computing the dot product of random boolean vectors. The assume that the two parties $P_1$ and $P_2$ have agreed on some $x(x \notin L. |x|=n)$, q, i, and $R=(R_b, R_x, R_y) \epsilon R_{q(n),p(n)}{}^{i+1}$. The protocol is specified as follows.

Player $P_1$ receives a random boolean vector $\vec{x}$, and player $P_2$ receives a random boolean vector $\vec{y}$. At the end of the protocol, player $P_1$ outputs a 0 or 1, which hopefully corresponds to $\vec{x} \cdot \vec{y}$.

Protocol

Dot-Product$(\vec{x},\vec{y})$/* $P_1$ knows $\vec{x}$, $P_2$ knows $\vec{y}$, and $|\vec{x}|=|\vec{y}|=q(n)$*/ $P_1$ and $P_2$ simulate the protocol $<P_{1,q(n)}, P_{2,q(n)}, V, T_{q(n),p(n)}{}^i[R]>$, on input x. They treat vectors $\vec{x}$ and $\vec{y}$ as substitutes for $x_{i+1}, y_{i+1}$ (which are not defined by R).

If the simulated verifier accepts, then $P_1$ outputs $b_{i+1}$, were $R_b=b_1, \ldots, b_{p(n)}$. Otherwise it outputs the complement of $b_{i+1}$.

We now analyze the communication complexity of this protocol.

Definition

Given a two-prover protocol $P=<P_1, P_2, V, T>$, and some input x, we define the leakage L(P,x) as the total number of bits transmitted from the provers to the verifier.

The following lemma follows immediately from the definition of Dot-Product.

Lemma A.4

Let $P=<P_{1,q(n)}, P_{2,q(n)}, V, T_{q(n),p(n)}{}^i[R]>$. Then protocol Dot-Product requires L(P,x) bits of communication. ∎

Finally, we can bound below Dot-Product's success rate on random vectors by the following lemma.

Lemma A.5

Given q(n) bit vectors $\vec{x}, \vec{y}$ distributed uniformly, the probability that Dot-Product $(\vec{x},\vec{y})=\vec{x} \cdot \vec{y}$ is at least $$\tfrac{1}{2} + (cheat_{q(n)}^{i+1}[R](x) - cheat_{q(n)}^{i}[R](x)). \quad (A.2.8)$$

Proof

Our proof is by a straightforward calculation of conditional probabilities, which we outline below. We define the variables good and bad by $$good = prob(\text{The simulated verifier accepts} | \vec{x} \cdot \vec{y} = b_i), \text{ and,}$$

$$bad = prob(\text{The simulated verifier accepts} | \vec{x} \cdot \vec{y} \neq b_i).$$

The probability the Dot-Product yields the correct answer is equal to $$\tfrac{1}{2} \cdot good + \tfrac{1}{2} \cdot (1 - bad). \quad (A.2.9)$$

We now solve for good and bad in terms of $cheat_{q(n)}{}^i[R](x)$ and $cheat_{q(n)}{}^{i+1}[R](x)$. Using our definitions for $cheat_{q(n)}{}^i[R](x)$ and $cheat_{q(n)}{}^{i+1}[R](x)$, we have $$cheat_{q(n)}^{i+1}[R](x) = good, \text{ and,} \quad (A.2.A)$$

$$cheat_{q(n)}^{i}[R](x) = \tfrac{1}{2} \cdot good + \tfrac{1}{2} \cdot bad. \quad (A.2.11)$$

Solving for good and bad, we have $$good = cheat_{q(n)}^{i+1}[R](x), \text{ and,} \quad (A.2.12)$$

-continued $$\text{bad} = \text{cheat}_{q(n)}^{i+1}[R](x) - \quad (A.2.13)$$
$$2(\text{cheat}_{q(n)}^{i+1}[R](x) - \text{cheat}_{q(n)}^{i}[R](x)).$$

Substituting equations (A.2.12) and (A.2.13) into equation A.2.9), and simplifying, we get equation (A.2.8). ∎

A.3 Implementing zero-knowledge with circuits

In this section we outline a technique we call the method of encrypted conversations. This technique represents a fairly general methodology for converting protocols into zero-knowledge protocols. Its main requirement is the ability of the parties involved to perform oblivious circuit evaluation.

A normal form for two-prover IPS's

For ease of exposition, we consider a normal form for two-prover interactive proof systems (IPS's). This normal form consists of three stages, as described below.

Notation

Throughout this section, $q_i(x,r,.,.,.)$ will denote that i-th question of the verifier computed on his random coin tosses r, the input x, and the history of the communication so far. ($a_i$ correspond to the provers answers).

Stage 1

On input x, where $|x|=n$, the verifier generates a sequence $r=r_1, \ldots, r_{p(n)}$ of random bits. The verifier computes his first question, $q_1=q_1(x,r)$.

Stage 2

The verifier sends $q_1$ to Prover 1. Prover 1 sends its answer, $a_1$ back to the verifier. The verifier computes his second question, $q_2=q_2(x,r,a_1)$.

Stage 3

The verifier sends $q_2$ to Prover 2. Prover 2 sends its answer, $a_2$, back to the verifier. The verifier computes its decision predicate, $\text{accept}(x,r,a_1,a_2)$, and accepts iff $\text{accept}(x,r,a_1,a_2)$ evaluates to "true".

We use the following result.

Theorem(normal form for 2 prover IPS's)

Given any two prover IPS P for a language L, there exists an IPS P', with the following 2 properties.
1. If $x \epsilon L$ then $\text{prob}(P'(x) \text{ accepts})=1$.
2. There exists some $c>0$ such that if x L then $\text{prob}(P'(x) \text{ accepts}) \leq 1-1/|x|^c$.

Remark

It is currently open whether the $\leq 1-1/|x|^c$ failure probability can be reduced. However, if greater reliability is desired, one may run a normal form protocol several times serially to achieve an exponentially low probability of failure.

We now need to show how to convert an IPS in normal form into a zero-knowledge IPS.

Conceptually, we would like to have the use of a black box into which the verifier inputs an encrypted history of the communication, the prover inputs its answer to the question and the output which is given to the verifier is the encrypted answer of the prover and the encrypted next question of the verifier. See FIG. 2.

The encryption scheme used to encrypt the questions and answers should be an information theoretically strong encryption scheme with respect to the verifier, while the provers will be given the ability to decrypt.

We describe how this is achieved in the following section A.3.1. The box is achieved by the technique of oblivious circuit evaluation as described in section A.3.2.

A.3.1 Strong encryption using 2-universal hash functions

We need a cryptographic system (call it E for the sake of discussion) which is both unbreakable, and existentially unforgeable. By unbreakable, we means that if one is given E(x), an encryption of x, but one does not have the decryption key, then one cannot infer anything about x. By existentially unforgeable, we mean that if one is given E(x), an encryption of x, but one does not have the decryption key, then one cannot produce any string forge such that forge=E(y) for some y. These security requirements are information theoretic, and must apply to someone with arbitrary computational power.

To accomplish this, we use the notion of universal hash functions, first introduced by Carter and Wegman[CW]. In addition, we require the following property of our universal sets.

Definition

A family of 2-universal sets $H_n$ of functions $h:\{0,1\}^n \to \{0,1\}^n$ is almost self-inverse iff for all c, and for all n sufficiently large (with respect to c), a function h, picked uniformly from H, will have an inverse $h^{-1} \epsilon H$ with probability $>1-n^{-c}$.

One example of an almost self-inverse 1-universal set of hash functions is the set of linear equations over $GF(2^n)$. As there is a trivial correspondence between $\{0,1\}^n$ and $GF(2^n)$. As there is a trivial corresondence between $\{0,1\}^n$ and $GF(2^n)$, we treat all our elements as being in $\{0,1\}^n$.

For our encryption system, we require that all legal message m are padded with a number of trailing 0's equal to the length of the original message. We encrypt a message $m \epsilon \{0,1\}^n$ by applying some uniformly selected function $h \epsilon H_n$ to it. We can decrypt h(m) by by applying its $h^{-1}$ to it. For our purposes, we can safely ignore the possibility that a uniformly chosen h isn't invertible. The following lemma shows that this encryption scheme is unbreakable and unforgeable.

Lemma

Let h be chosen uniformly from $H_n$. Then $$(\text{unbreakability}) \ (\forall x,y \epsilon \{0,1\}^n) \text{prob}(h(x)=y)=2^{-n}. \quad (1)$$

$$\begin{aligned}&(\text{unforgeability})\\&(\forall x,y,z \epsilon \{0,1\}^n)\text{-}\\&\text{prob}(\exists w \epsilon \{0,1\}^{n/2}0^{n/2})h(w)=z|h(x)=y)=2^{-n/2}. \quad (2)\end{aligned}$$

Proof

Both properties follow immediately from the definition of 2-universal hash functions. ∎

In the protocol the provers will agree on four random hash functions $h_1, h_2, h_3, h_r \square H_{p(n)}$. At the end of the protocol, the verifier will possess the values of $h_1(r)$, $h_2(q_1)$, and $h_3(a_1)$, but will not possess any extra information about which functions $h_1$, $h_2$ and $h_3$ actually are. However, knowing the value of h(x) gives no information, in the information theoretic sense, about the value of x. This is roughly how the zero-knowledge aspect of our protocol is achieved.

A.3.2 Use of oblivious circuit evaluation

We use the reduction of Kilian[K] from oblivious transfer to oblivious circuit computation. This reduction maintains the usual security properties desired of oblivious circuit evaluation, without recourse to any intractibility assumptions.[5] Its sole requirement is a sequence $O = O_1, \ldots, O_{p(n)}$ of bits, all of which are known to A, and half of which are known to B (a more detailed description of this condition is given in section A.2). This set of bits (or, more technically, a reasonable approximation to such a set) is provided by the oblivious transfer protocol outlined in section A.2 for the rest of this discussion, we treat oblivious circuit evaluation as a primitive operation.

[5] Goldreich-Vainish describe a simple reduction from oblivious circuit evaluation to oblivious transfer, without any intractibility assumptions. However, this reduction only works for honest parties, and is thus unuseable by us.

A.3.3 Outline of the Zero-Knowledge Protocol

We can now describe our zero-knowledge transformed protocol For our expositions, we still treat oblivious circuit computation of as a primitive. (A description of circuits $C_o$, $C_1$, $C_2$ and $C_3$ is given following the protocol.) Note the similarity between this description and the description of the normal-form for protocols given above.

On input x, where $|x| = n$.

Step 0

Provers 1 and 2 agree on random invertible hash functions $h_1, h_2, h_3, h_4 \in H_{2p(n)}$, and random string $r_1 \in \{0,1\}^{p(n)}$. The verifier selects a random string $r_2 \in \{0,1\}^{p(n)}$. The verifier and Prover 1 evaluate $r' = C_o[x](r_1, r_2, h_1)$. (/r will the random coin tosses to be used by the verifier).

Step 1

The verifier and Prover 1 then evaluate $q_1' = C_1[x](r', h_i^{-1}, h_2)$, the encrypted version of the verifier's first question.

Step 2

The verifier sends $q_1'$ to Prover 1. If $h_2^{-1}(q_1')$ does not decrypt to a legitimate message, then Prover 1 halts the conversation. Otherwise, Prover 1 computes his answer, $a_1$, and sends the verifier $a_1' = h_3(a_1)$. The verifier and Prover 1 evaluate $q_1' = C_2[x](r', a_1', h_1^{-1}, h_3^{-1}, h_4)$, the encrypted version of the verifiers second question.

Step 3

The verifier sends $q_2'$ to Prover 2. If $h_4^{-1}(q_2')$ does not decrypt to a legitimiate message, then Prover 2 halts the conversation. Otherwise, Prover 2 computes his answer, $a_2$. The verifier and Prover 2 evaluate decision $= C_3[x](r', a_1', a_2, H_1^{-1}, h_3^{-1})$.

At the end of this protocol, verifier accepts iff decision = true.

We now describe circuits $C_i$ for $i = 0, 1, 2, 3$.

For each circuit, we give the input from the prover, the input from the verifier, and the output given to the verifier. We adopt the convention that $|x| = n$, and assume without loss of generality that all strings being exchanged in the protocol are of length p(n), for some polynomial p. We use the following simple functions to simplify our exposition. Function $pad_n: \{0,1\}^n \rightarrow \{0,1\}^{2n}$ pads an extra n zeros onto the end of an n-bit string Function $strip_n: \{0,1\}^{2n} \rightarrow \{0,1\}^n$, which removes the last n bits from a 2n-bit string. Predicate $legal_n: \{0,1\}^{2n} \rightarrow \{true, false\}$ is true iff the last n bits of the input string are equal to 0.

$C_o[x]$

Input from the prover
A sequence of bits, $b = b_1, \ldots, b_{p(n)}$, and a hash function $h \in H_{2p(n)}$.
Input from the verifier
A sequence of bits $c = c_1, \ldots, C_{p(n)}$.
Output to the verifier: $Output(h(pad_n(b \oplus c)))$.

Circuit $C_o[x]$ is the initialization circuit that creates the verifiers random bits in Stage 1 of the protocol described above.

---

$C_1[x]$:
Input from the prover:
Hash functions $h_1^{-1}, h_2 \in H_{2p(n)}$.
Input from the verifier:
String $r' \in \{0;1\}^{2p(n)}$.
Output to the verifier:
$r = h_1^{-1}(r')$
If $legal_{p(n)}(r)$ = false
Then $Output(O^{2p(n)})$
Elde $r = strip_{p(n)}(r)$
$q_1 = q_1(x, r)$
$Output(h_2(pad_{p(n)}(q_1)))$

---

Circuit $C_1[x]$ is used to implement Stage 1 of the protocol described above.

---

$C_2[x]$:
Input from the prover:
Hash functions $h_1^{-1}, h_4 \in H_{2p(n)}$
Input from the verifier:
Strings $r', a'_1 \in \{0,1\}^{2p(n)}$
Output to the verifier:
$r = h_1^{-1}(r')$
$a_1 = h_3^{-1}(a_1')$
If $(legal_{p(n)}(r)$ and $legal_{p(n)}(a_1))$ = false
Then $Output(O^{2p(n)})$
Else $r = strip_{p(n)}(r)$
$a_1 = strip_{p(n)}(a_1)$
$q_2 = q_2(x, r, a_1)$
$Output(h_4(pad_{p(n)}(q_2)))$

---

Circuit $C_2[x]$ is used to implement Stage 2 of the protocol described above.

---

$C_3[x]$:
Input from the prover:
Hash functions $h_1^{-1}, h_3^{-1} \in H_{2p(n)}$,
String $a_2 \in \{0,1\}^{p(n)}$
Input from the verifier:
Strings $r', a'_1 \in \{0,1\}^{2p(n)}$.
Output to the verifier:
$r = h_1^{-1}(r')$
$a_1 = h_3^{-1}(a_1')$
If$(legal_{p(n)}(r)$ and $legal_{p(n)}(a_1))$ = false
Then $Output(O^{2p(n)})$
Else $r = strip_{p(n)}(r)$
$a_1 = strip_{p(n)}(a_1)$
$Output(accept(x, r, a_1, a_2))$

---

Circuit $C_3[x]$ is used to implement Stage 3 of the protocol described above.

The two obvious questions we must deal with are, "Is this protocol still a proof system?", and "Is this protocol zero-knowledge?"

Is this protocol a proof system?

If the verifier is honest, and if the provers input the correct hash functions, and their inverses, into the circuits being evaluated, then one can map transcripts of conversations in this protocol into transcripts of the original protocol (with possibly cheating provers). In this case, the provers cannot cheat any more effectively they could in the original protocol, and the new protocol will remain a proof system if the original one was.

If the provers do not input consistent sets of hash functions, then nothing can be guarenteed about whether the protocol remains a proof system. However, using the machinery developed in [K], it is possible for the provers to commit, at the beginning of the protocol, all the hash functions they input to the circuits, along with a zero-knowledge proof that these inputs are consistent with each other.

Is this protocol zero-knowledge?

The proof that this protocol is zero-knowledge is, while not overly complex or difficult, relies too heavily on machinery from [K] to be concisely presented here. We make the following intuitive argument for why the protocol is zero-knowledge.

First, note that the verifier's actions are severely restricted by the use of circuits and the encryption scheme. Except for its random bits, all the inputs it gives to the provers or the circuits are encrypted with an unforgeable system. If the verifier ever attempts to give an incorrect string to a prover, the prover will detect the forgery will probability exponentially close to 1. Likewise, if the verifier inputs an incorrect string to a circuit, it will almost certainly output either $0^{2p(n)}$ or false. This rules out any active attack on the part of the verifier.

Second, we show that passive attacks by the verifier do not yield ay information. The intermediate outputs of circuits $C_1, \ldots, C_3$ are all uniformly distributed, and thus yield no information.

F Applications of the two-processor system to general protocols

Our two-processor system can be used to solve problems more general than simple identification. A two-processor smart card (or other similar system) can interact with another agency in any general two-party protocol. Let X designate a string, number, or other encoding of some information possessed by a two-processor smart card (or other similar system). Let Y designate a string, number, or other encoding of some information possessed by a second party. This second party may have the ability to isolate the two processors on the smart card (or other similar system), or the processors may be isolated by some further external mechanism.

Let F be any function which may be described by a circuit. Then the two-processor smart card (or other similar system) can interact with the second party, so that the following conditions hold.

1. The second party learn the value of F(X,Y).
2. For as long as the two processors on the smart card (or other similar system) cannot compute any information about Y. Thus, subject to the isolation condition being maintained, the second party's security is unconditionally protected in this phase of the interaction. This security does not depend on any assumptions about the intractability of computing special functions.
3. The second party learns no further information about X than may be inferred from knowing Y and F(X,Y). This security condition remains even after the isolation of the two processors has terminated.

The technique for implementing general protocols satisfying the above security conditions is described in the document, Multi-Prover Interactive Proof Systems: Eliminating Intractability Assumptions.

References [BC] Brassard, Gilles and Claude Crépeau. "Zero-Knowledge Simulation of Boolean Circuits," Proceedings of the 27th FOCS, IEEE, 1986, 188–195.

[GM] Goldwasser S., and Micali S., "Probabilistic Encryption", JCSS, vol. 28, no. 2, 1984, pp. 270–299.

[GHY] Galil Z., Haber S., and Yung M., "A Private Interactive Test of a Boolean Predicate and Minimum-Knowledge Public-Key Cryptosystem", Proceedings of the 26th FOCS, 1985, pp. 360–371.

[GMW] Goldreich, Oded, Silvio Micali, and Avi Wigderson. "Proofs that Yield Nothing but the Validity of the Assertion, and a Methodology of Cryptographic Protocol Design," Proceedings of the 27th FOCS, IEEE, 1986, 174–187.

[GMR] Goldwasser, Shafi, Silvio Micali, and Charles Rackoff. "The Knowledge Complexity of Interactive Proof-Systems," Proceedings of the 17th STOC, ACM, 1985, 291–304.

[AL] Angluin, Dana and David Lichtenstein. "Provable Security of Cryptosystems: a Survey," YALEU/DCS/TR-288, 1983. Proceeding of the 17th STOC, 1985, pp. 421–429.

[Ba] Barrington, D. "Bounded Width Polynomial Size Branching Programs Recognize Exactly Those Languages in $NC^1$", Proceedings of 18th STOC, 1986, pp. 1–5.

[Bl] Blum, M., Private Communication.

[BC] Brassard, Gilles and Claude Crépeau. "Zero-Knowledge Simulation of Boolean Circuits," Proceedings of the 27th FOCS, IEEE, 1986, 188–195.

[BHZ] Boppana, Ravi, Johan Hastad, and Stathis Zachos. "Does CoNP Have Short Interactive Proofs?," IPL, 25, 1987, 127–132.

[CDvdG] Chaum, David, Ivan Damgard, and Jeroen van de Graaf. "Multiparty Computations Ensuring Secrecy of Each Party's Input and Correctness of the Output," Proceedings of CRYPTO '87. Proceedings of CRYPTO '85, Springer-Verlag, 1986, 477–488.

[CG] Chor, B, Goldreich G, "Unbiased Bits from Sources of Weak Randomness and Probalistic Communication Complexity", Proceedings of the 26th FOCS, 1985.

[Ck] Crépeau C., Kilian J., Private Communication.

[CW] Carter L., Wegman M., "Universal Classes of Hash Functions", JCSS 18, 1979, pp. 143–154.

[C] Crépeau Claude, "On the Equivalence of Two Types of Oblivious Transfer", Crypto87.

[FST] Feige, U., Shamir, A., Tennenholz, M., "The Noisy Oracle Problem", Private Communication of Manuscript

[F] Fortnow, Lance. "The Complexity of Perfect Zero-Knowledge," Proceedings of the 19th STOC, ACM, 1987, 204–209.

[FRS] Fortnow, Lancé., Rompel J., Sipser M., "On the Power of Multi-Prover Interactive Proofs" In preparation.

[FMR] Fischer M., Micali S., Rackoff C., and Wittenberg S., "An Oblivious Transfer Protocol Equivalent to Factoring", In Preparation.

[GM] Goldwasser S., and Micali S., "Probabilistic Encryption", JCSS, vol. 28, no. 2, 1984, pp. 270-299.

[GHY] Gali Z., Haber S., and Yung M., "A Private Interactive Test of a Boolean Predicate and Minimum-Knowledge Public-Key Cryptosystem", Proceedings of the 26th FOCS, 1985, pp. 360-371.

[EGL] Even S., Goldreich O., and A. Lempel, A Randomized Protocol for Signing Contracts, CACM, vol. 28, no. 6, 1985, pp. 637-647.

[GMS] Goldreich O.,, Mansour Y.,, and Sipser M.,, "Interactive Proof Systems: Provers that Never Fail and Random Selection", Proceedings of the 28th FOCS, 1987, pp. 449-462.

[GMW1] Goldreich, Oded, Sivio Micali, and Avi Wigderson. "Proofs that Yield Nothing but the Validity of the Assertion, and a Methodology of Cryptographic Protocol Design," Proceedings of the 27th FOCS, IEEE, 1986, 174-187.

[GMW2] Goldreich, Oded, Silvio Micali, and Avi Wigderson. "How to Play ANY Mental Game," Proceedings of the 19th STOC, ACM, 1987, 218-229.

[GV] Goldreich, O., Vainish, R. "How to Solve any Protocol Problem: An Efficiency Improvement", Crypto 87.

[GMR] Goldwasser, Shafi, Silvio Micali, and Charles Rackoff. "The Knowledge Complexity of Interactive Proof-Systems," Proceedings of the 17th STOC, ACM, 1985, 291-304.

[HM] Hastad J., Mansour Y., "Private Communication"

[K] Kilian, J. "On the Power of Oblivious Transfer," Proceedings of this conference

[L] Lautemann C., "BPP and the Plynomial Time Hierarchy", IPL, 14, 1983, pp. 215-217.

[R] Rabin, M., "How to exchange secrets by oblivious transfer", Tech. Memo TR-81, Aiken Computation Laboratory, Harvard University, 1981.

[Yao82] Yao, Andrew C. "Protocols for Secure Computations," Proceedings of the 23rd FOCSA, IEEE, 1982, 160-164.

[Yao86a] Yao, Andrew C. "How to Generate and Exchange Secrets," Proceedings of the 27th FOCS, IEEE, 1986, 162-167.

[Yao86b] Yao, Andrew C. "Theory and Applications of Trapdoor Functions", Proc. of the 23rd FOCS, 1982, IEEE, pp. 80-91.

We claim:

1. A method in a multiparty verification system for processing respective outputs from a prover and a verifier, the prover comprising first and second prover units which share information, the method comprising:
   limiting communications between the first and second prover units;
   in the first prover unit encrypting identification information based on confidential verifier information from the verifier and confidential prover information shared by the first and second prover units;
   providing prover information required for decryption from the second prover unit to the verifier.

2. A method as claimed in claim 1 wherein the confidential verifier information and the confidential prover information are chosen at random.

3. A method in a multiparty verification system for processing respective outputs from a prover and a verifier, the prover comprising first and second prover units which share confidential information for generating outputs therefrom, communication between the first and second prover units being limited when the prover and verifier are coupled, the method comprising:
   providing verifier encryption information from the verifier to the prover;
   causing the first prover unit to commit to a transfer of information to the verifier, the transferred information being encrypted by the first prover unit based on the verifier encryption information and prover encryption information shared by the first and second prover units;
   providing selection information from the verifier to the second prover unit to select one of plural subsets of the encrypted information for decryption;
   providing prover encryption information, corresponding to the selected subset of the encrypted information, exclusively, from the second prover unit to the verifier; and
   decrypting the selected subset of encrypted information.

4. A method as claimed in claim 3 wherein the prover encryption information shared by the first and second prover units comprises random information.

5. A method as claimed in claim 4 wherein the verifier encryption information and the selection information are chosen at random.

6. A method as claimed in claim 3 wherein both the prover and verifier have access to an identification set of numbers and a target number and the prover alone has acess to the identity of a solution subset of the identification set, the sum of the numbers of the solution subset equalling the target number.

7. A method as claimed in claim 3 wherein the prover and verifier both have access to a graph and the prover alone has access to a Hamiltonian cycle within the graph.

8. A method as claimed in claim 3 wherein both the prover and verifier have access to an identification set of information and the prover alone has access to the identity of a solution subset of the identification set, the solution subset having a predetermined mathematical relationship with the identification set, the solution subset being readily verifiable as a proper solution but not being readily determinable from the identification set of information.

9. A method as claimed in claim 8 wherein the first prover unit, in a plurality of cycles with respect to identification sets of information permutated by the first prover unit, transfers each permuted identification set encrypted, and the selection information selects information including the full identification set or the solution subset, exclusively.

10. A method as claimed in claim 3 further comprising, in a plurality of cycles, permutating the information by the first prover unit which is encrypted and transferred to the verifier.

11. An identification method in a multiparty verification system for processing respective outputs from a prover and a verifier to identify the prover, the prover and verifier sharing an identification set of information, the prover comprising first and second prover units which share confidential information comprising a solution subset of information having a predetermined mathematical relationship with the identification set of information, the solution subset being readily identifiable as a proper solution but not being readily determinable from the identification set of information, communication between the first and second prover units being limited when the prover and verifier are coupled, the method comprising, in a plurality of cycles with respect to identification sets of information permutated by the first prover unit:

provide verifier encryption information from the verifier to the first prover unit;

in the first prover unit encrypting, based on the verifier encryption information and prover encryption information shared by the first and second prover units, permutated information derived from the identification set of information, and forwarding the encrypted information to the verifier;

providing selection information from the verifier to the second prover unit to select the identification set of information or the solution subset of the encrypted permutated information for decryption;

providing prover encryption information corresponding to the selected encrypted information from the second prover unit to the verifier; and decrypting the selected encrypted information.

12. A method as claimed in claim 11 wherein the prover encryption information shared by the first and second prover units comprises random information.

13. A method as claimed in claim 12 wherein the verifier encryption information and the selection information are chosen at random.

14. A method as claimed in claim 11 wherein both the prover and verifier have access to an identification set of numbers and a target number and the prover alone has access to the identity of a solution subset of the identification set, the sum of the numbers of the solution subset equalling the target number.

15. A method as claimed in claim 14 wherein the permutated information comprises $A = \{v_i, 1 \leq i \leq n\}$ where $v_i$ is chosen at random in $$\left\{ 1, \ldots, \sum_{i=1}^{n} w_i \right\}.$$

$B = \{w_i, 1 \leq i \leq n\}$, the identification set
$C = \{s_i, 1 \leq i \leq n\}$ where $s_i = v_i + w_i$ for all $1 \leq i \leq n$
$D = \Sigma_{j \in J} v_j$
$E = J$, the solution subset
$F = T + E_{j \in J} v_j$, where T is the target and the selection information selects (A,B,C), (A,D,E) or (C,E,F).

16. A method as claimed in claim 11 wherein the prover and verifier both have access to a graph and the prover alone has access to a Hamiltonian cycle within the graph.

17. A data processing system for implementing a verification sequence comprising first and second processors in communication with each other, the first processor comprising at least first and second units which share confidential information and which are prevented from communicating with each other regarding verification information when in communication with the second processor during the verification sequence, the first and second processors cooperating in communication with each other to provide an output as a function of the confidential information of the first processor without disclosure of the confidential information of the first processor such that the second processor is assured of the validity of the output due to its separate communication with the first and second units of the first processor.

18. A system as claimed in claim 17 wherein the confidential information of the first processor is information x to which a function F(x) is applied, F(x) being readily computed but being difficult to invert, the second processor has access to F(x) and the first and second processors communicate such that the first processor demonstrates to the second processor its possession of x without disclosure of x.

19. A system as claimed in claim 17 wherein the first unit of the first processor encrypts and transfers information to the second processor, the encryption being based on confidential information from the second processor and confidential information shared by the first and second units of the first processor, and the second unit of the first processor transfers shared confidential information required for decryption to the second processor.

20. A system as claimed in claim 19 wherein the second unit of the first processor responds to selection information from the second processor to transfer to the second processor the information required for decryption of one of plural subsets of the encrypted information.

* * * * *

UNITED STATES PATENT AND TRADEMARK OFFICE
CERTIFICATE OF CORRECTION

PATENT NO. : 4,926,479

DATED : May 15, 1990

INVENTOR(S) : Shafi Goldwasser, Joseph Kilian, Avi Wigderson and Michael Ben-Or

It is certified that error appears in the above-identified patent and that said Letters Patent is hereby corrected as shown below:

In Claim 6, line 29, change "acess" to --access--.

In Claim 9, line 48, change "permuted" to --permutated--.

In Claim 15, line 46, change "$E_{j \in J}$" to --$\sum_{j \in J}$--.

Signed and Sealed this

Fourteenth Day of May, 1991

*Attest:*

HARRY F. MANBECK, JR.

*Attesting Officer*  *Commissioner of Patents and Trademarks*